US011847174B2

(12) United States Patent
Pande

(10) Patent No.: US 11,847,174 B2
(45) Date of Patent: Dec. 19, 2023

(54) SYSTEM AND METHOD FOR GEO-LOCKED DOCUMENTS

(71) Applicant: Open Text Corporation, Waterloo (CA)

(72) Inventor: Vaibhav Pradip Pande, Hyderabad (IN)

(73) Assignee: OPEN TEXT CORPORATION, Waterloo (CA)

(*) Notice: Subject to any disclaimer, the term of this patent is extended or adjusted under 35 U.S.C. 154(b) by 105 days.

(21) Appl. No.: 16/844,827

(22) Filed: Apr. 9, 2020

(65) Prior Publication Data
US 2020/0327166 A1 Oct. 15, 2020

Related U.S. Application Data

(60) Provisional application No. 62/832,135, filed on Apr. 10, 2019.

(51) Int. Cl.
G06F 16/00 (2019.01)
G06F 16/909 (2019.01)
G06F 16/9038 (2019.01)
G06F 16/9035 (2019.01)
G06F 16/93 (2019.01)
G06F 16/387 (2019.01)

(52) U.S. Cl.
CPC .......... G06F 16/909 (2019.01); G06F 16/387 (2019.01); G06F 16/9035 (2019.01); G06F 16/9038 (2019.01); G06F 16/93 (2019.01)

(58) Field of Classification Search
CPC .................................................. G06F 16/387
See application file for complete search history.

(56) References Cited

U.S. PATENT DOCUMENTS

2002/0051540 A1* 5/2002 Glick .................. H04L 63/1408
380/258
2012/0142379 A1* 6/2012 Park .................. H04M 1/72463
455/457

* cited by examiner

Primary Examiner — Ajith Jacob
(74) Attorney, Agent, or Firm — Sprinkle IP Law Group

(57) ABSTRACT

An object security system comprising a data store storing a document, a processor, and a memory coupled to the processor. The object security system comprises a set of computer instructions executable to provide a user interface to a user, the user interface having controls to allow the user to provide a geo-lock definition for the document, receive the geo-lock definition and assert a geo-lock on the document in the data store based on the geo-lock definition. The geo-lock is enforceable to allow access to the document based on a determination that a target geographic location associated with the document is an allowed location specified by the geo-lock and enforceable to take an action based on a determination that the target geographic location associated with the document is not the allowed location specified by the geo-lock.

20 Claims, 14 Drawing Sheets

```
// This is to check if a geo-lock is enabled for a fixed location or an area
Var getSettings = conf.getGeoSettings();
Location currentlocation = ApiHandle.getLocation(); // returns current location
If( getSettings == enumFixedLocation)

{

//get allowed location for document and convert to required data type for //comparison Location allowedLocation =    < Location > conf.getAllowedLocationForDocument();
        If( allowedLocation == currentlocation)
        {
                // Validation OK, go ahead for document access
        }

Else

{
                // Block the access of document, show proper notifications, or take other specified action
        }
}
Else If( getSettings == enumLocationArea)
{
        //get allowed location area for document and convert to required data type for //comparison LocationArea allowedLocationArea =    < LocationArea > conf.getAllowedLocationAreaForDocument();
        If( allowedLocationArea.contains(currentlocation))

{
                // Validation OK, go ahead for document access
        }

Else

{
                // Block the access of document, show proper notifications, or other specified action
        }
}
```

FIG. 14

SYSTEM AND METHOD FOR GEO-LOCKED DOCUMENTS

RELATED APPLICATIONS

This application claims the benefit of priority under 35 U.S.C. § 119(e) to U.S. Provisional Patent Application No. 62/832,135, entitled "System and Method for Geo-Locked Documents," filed Apr. 10, 2019, which is hereby fully incorporated herein by reference for all purposes.

TECHNICAL FIELD

The present disclosure relates to systems and methods for controlling access to electronic documents based on location.

BACKGROUND

Data security and privacy are becoming increasingly important aspects of content management. Many enterprises employ systems that apply access controls to documents to limit which users can access documents based on user, group, role or other criteria. Once a user is permitted access to a document, the user may, in many cases, disseminate the document across recipients. In some cases, the shared document is secured by a password or key. Such mechanisms fail to restrict access to the document to a given geographic proximity or location area. If the password or key is compromised on a shared document, the document may be opened outside of the enterprise's infrastructure.

SUMMARY

Embodiments described herein provide systems and methods for asserting and enforcing geo-locks on objects. A geo-lock provides a mechanism to restrict access or distribution of an object to a geographic location. Geo-locks may be used in addition to other security mechanisms such as passwords and keys.

According to one embodiment, an object security system is provided. The object security system may comprise a data store configured to store documents, a processor, and a memory coupled to the processor. The memory may be configured with a set of computer instructions executable by the processor. The set of computer instructions may be executable to provide a user interface to a user, the user interface having controls to allow a user to provide a geo-lock definition for a document. The set of computer instructions may be executable to assert a geo-lock on a document in the data store using the geo-lock definition. The geo-lock may be enforceable to allow access to the document based on a determination that a target geographic location of the document is an allowed location specified by the geo-lock and to take an action based on a determination that the target geographic location is not the allowed location specified by the geo-lock. The set of computer instructions may be executable to enforce the geo-lock.

Another embodiment includes a non-transitory computer-readable medium having computer-readable program code stored thereon, the computer-readable program code comprising instructions for providing a user interface to a user, receiving a geo-lock definition for a document based on user interaction with the user interface and asserting a geo-lock on the document using the geo-lock definition. The user interface may have controls to allow the user to provide the geo-lock definition for a document. The geo-lock may be enforceable to allow access to the document based on a determination that a target geographic location associated with the document is an allowed location specified by the geo-lock. The geo-lock may be enforceable to take an action based on a determination that the target geographic location associated with the document is not the allowed location specified by the geo-lock. The computer-readable program code may comprise instructions for enforcing the geo-lock.

Another embodiment includes a method for geo-locking objects. The method can comprise providing a user interface to a user, receiving a geo-lock definition for a document based on user interaction with the user interface and asserting a geo-lock on the document using the geo-lock definition. The user interface may have controls to allow the user to provide the geo-lock definition for a document. The method may further include enforcing the geo-lock. The geo-lock may be enforceable to allow access to the document based on a determination that a target geographic location associated with the document is the allowed location specified by the geo-lock. The geo-lock may be enforceable to take an action based on a determination that the target geographic associated with the document is not the allowed location specified by the geo-lock.

As discussed above, a geo-lock may be enforceable to allow access to a document based on a determination that a target geographic associated with the document is an allowed location specified in the geo-lock and to take another action if the target geographic associated with the document is not the allowed location. The allowable location may be a fixed location, a user defined area, or other location that is designated as an allowable location for the document. The target geographic associated with the document may be the location of a system that requested the document, the location of a system to which the document is being sent, the current location of the document or other location for which the geo-lock can be enforced. Determining that the target geographic associated with the document is the allowed location specified by the geo-lock may include, for example, determining that the target geographic matches or is within the allowed location.

A geo-lock may be enforceable to take some action based on a determination that the target geographic associated with the document is not the allowed location specified by the geo-lock. For example, a geo-lock may be enforceable to take an action based on a determination that the target location associated with the document does not match or is not within the allowed location. The action may include blocking access to the document, sending a notification to a user or taking another action.

In some embodiments, a script may be embedded in a document to enforce the geo-lock. According to one embodiment, the script comprises instructions for determining a current location of the document; comparing the current location of the document to the allowed location; determining if the current location is the allowed location; if the current location is the allowed location, then allowing the document to be opened; else, performing the action.

These, and other, aspects of the disclosure will be better appreciated and understood when considered in conjunction with the following description and the accompanying drawings. It should be understood, however, that the following description, while indicating various embodiments of the disclosure and numerous specific details thereof, is given by way of illustration and not of limitation. Many substitutions, modifications, additions and/or rearrangements may be made within the scope of the disclosure without departing from the spirit thereof, and the disclosure includes all such substitutions, modifications, additions and/or rearrangements.

BRIEF DESCRIPTION OF THE DRAWINGS

The drawings accompanying and forming part of this specification are included to depict certain aspects of the disclosure. It should be noted that the features illustrated in the drawings are not necessarily drawn to scale. A more complete understanding of the disclosure and the advantages thereof may be acquired by referring to the following description, taken in conjunction with the accompanying drawings in which like reference numbers indicate like features and wherein:

FIG. 14 provides a pseudo-code representation of one embodiment of a script.

DETAILED DESCRIPTION

Figure 1:
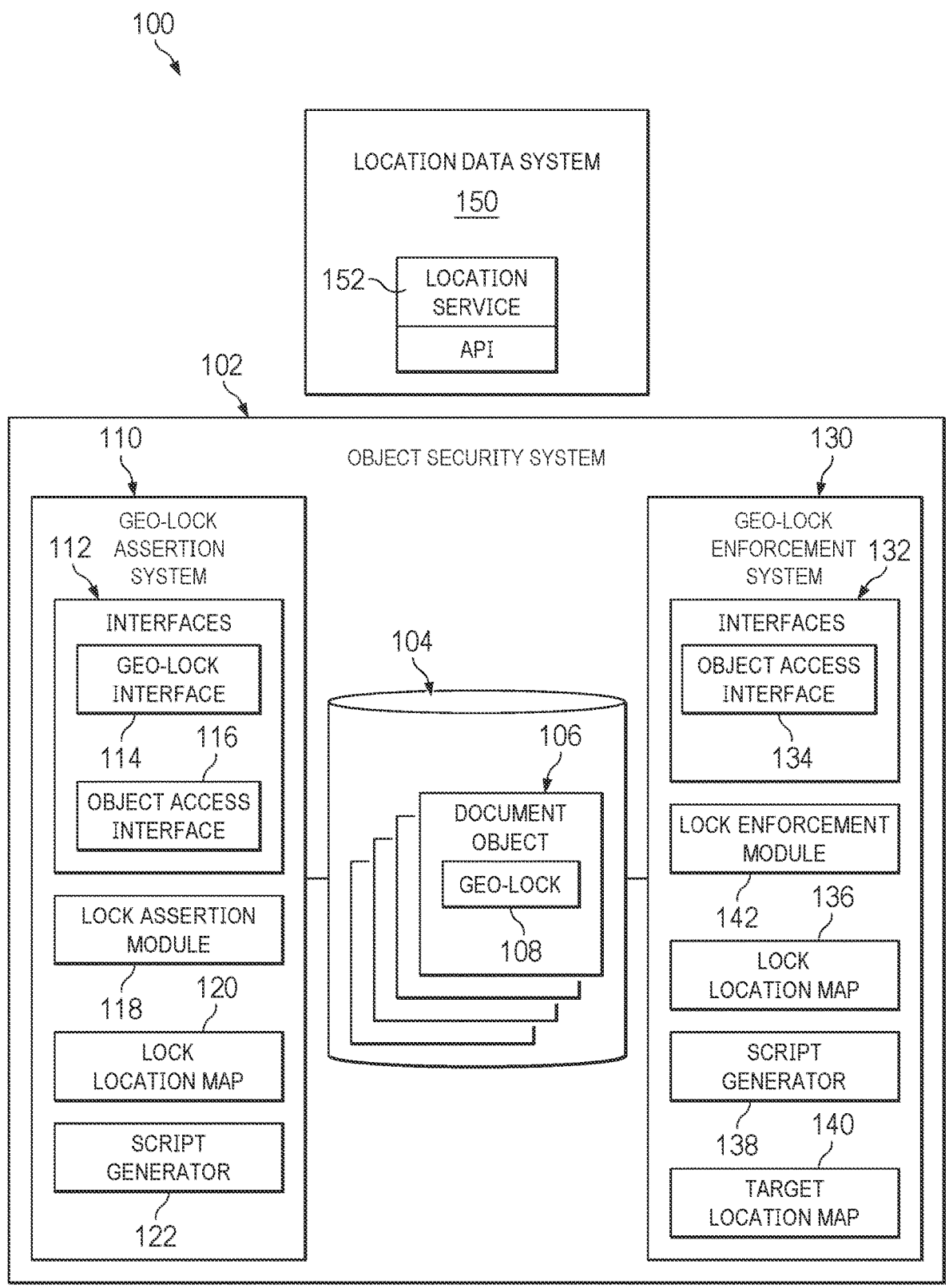
FIG. 1 is a diagrammatic representation of one embodiment of an object-security system.

Embodiments and the various features and advantageous details thereof are explained more fully with reference to the non-limiting embodiments that are illustrated in the accompanying drawings and detailed in the following description. Descriptions of well-known starting materials, processing techniques, components and equipment are omitted so as not to unnecessarily obscure the embodiments in detail. It should be understood, however, that the detailed description and the specific examples are given by way of illustration only and not by way of limitation. Various substitutions, modifications, additions and/or rearrangements within the spirit and/or scope of the underlying inventive concept will become apparent to those skilled in the art from this disclosure.

Embodiments described herein provide systems and methods for asserting and enforcing geo-locks on objects (e.g., documents). According to various embodiments, geo-locks can be asserted on individual objects (e.g., on individual documents), and thus a geo-lock may be object/document-specific to provide granular location-based control.

Geo-locks may be used for a variety of applications. For example, document production technologies that generate documents from specified templates can be adapted to use geo-locking to enhance the security and privacy aspects related to document sharing. Moreover, geo-locking may be used to enhance regulatory compliance. For example, compliance to the General Data Protection Regulation (GDPR) is key to some information management organizations and geo-locking can be used to easily and precisely control within which countries a given document can be accessed or shared. As yet another example, geo-locking may be leveraged to provide notifications to document authors (or other users) when a document lands at or is accessed at a location that is outside of an allowed location. Geo-locking may also be used to target content to specified locations.

Readily available location Application Programming Interfaces (API's) can be leveraged when defining and/or enforcing geo-locks. For example, some embodiments leverage commercially available services to obtain location data. Moreover, GPS data can be used when enforcing geo-locks. For example, some embodiments can use the GPS data provided by a computer system's internal GPS chip to determine a current location. Some embodiments use "assisted GPS" or "network-based positioning" technology to compute a computer system's location, in some cases with the help of internet-based servers, when enforcing a geo-lock.

Geo-lock enforcement can be implemented at various locations. For example, in some embodiments, a server implements a lock enforcement module that is adapted to allow or deny access to a document (or take other action with respect to the document) based on a target location for the document. As another example, in some embodiments, a recipient system implements a lock enforcement module. For example, a recipient system may execute a plug-in or an embedded script for a document application, where the plug-in or script is executable to determine the current location of a document, compare the current location with an allowed location, if the test is passed, continue to open the document, else if test is failed, deny the access, send a notification, or take another specified action. The lock enforcement module can determine the current location of the document using, for example, GPS data from a GPS chip of the recipient system, using assisted GPS, using network-based positioning or using other techniques.

FIG. 1 is a block diagram of one embodiment of a system 100 for geo-locking objects to provide enhanced security. System 100 includes an object security system 102 coupled to a location data system 150 via a network. Location data system 150 includes a location service 152 that provides location data to requesting applications. According to one embodiment, location service 152 may include an API that provides a map or geographic coordinate information to other applications. Location service 152 may be, for example, a commercially available map service that provides geographic coordinate information to other applications via a public API.

Object security system 102 comprises a data store 104, a geo-lock assertion system 110 and a geo-lock enforcement system 130. The components of object security system 102 can be distributed to any number of computer systems. In various embodiments, one or more components of geo-lock assertion system 110 and geo-lock enforcement system 130 reside at a content system, such as a content management system. Thus, in some embodiments, a content management system may comprise object security system 102.

Data store 104 may include one or more file systems, databases or other data stores to store managed items. Data store 104 may provide an object-based data store in which documents (whole documents, document fragments) or other data resources are managed as a set of objects. Each document in data store 104 may thus be managed as a document object 106 that includes the document and associated metadata. The document metadata may include, for example, an object identifier, such as a globally unique identifier (GUID), that uniquely identifies the document. Each document may be a file stored in a filesystem or database. In some embodiments, a document object may be persisted as a database record that includes the document metadata and includes or points to a document file.

A document object 106 may include a geo-lock 108 associated with a document, where the geo-lock 108 comprises information that indicates a geographic location in which the associated document can be accessed or for which the document can be used. In one embodiment, object security system 102 may be configured with a set of system defined geographic locations (a system defined geographic location is referred to as a 'fixed location' herein), and a geo-lock 108 may indicate one or more of the fixed geographic locations. In addition, or in the alternative, object security system 102 may provide an interface to allow an end user to define ad hoc geographic locations, and a geo-lock 108 may thus indicate one or more user defined geographic locations. In one embodiment, a geo-lock 108 asserted on a document is stored as metadata for the document. In another embodiment, the geo-lock is embedded in the document itself (e.g., embedded in a document file).

A geo-lock 108 may represent a geographic location in a variety of manners. For example, a geo-lock 108 may include one or more location names where the location names map to geographic coordinates (latitude and longitude) in object security system 102. As another example, a geo-lock 108 may include geographic coordinates for a location, such as a set of geographic coordinates for a bounding shape that defines a location. In some embodiments, a geo-lock 108 includes logic to enforce the geo-lock 108. For example, a geo-lock 108 may include a script that is executable to allow or deny access to a document based on geographic locations indicated for the document.

Geo-lock assertion system 110 comprises interfaces 112, including a geo-lock interface 114 and an object access interface 116. The interface functionality of interfaces 112 may be provided through any suitable mechanism including, but not limited to, a web application server exposing a REST API, a web page, a mobile application or through another mechanism.

Object access interface 116 provides functionality for accessing items in data store 104. Geo-lock assertion system 110 processes requests submitted via the interface 116 to enable a user to perform various operations, such as uploading items, downloading items, reserving items, editing content, searching and performing other operations.

Figure 6:
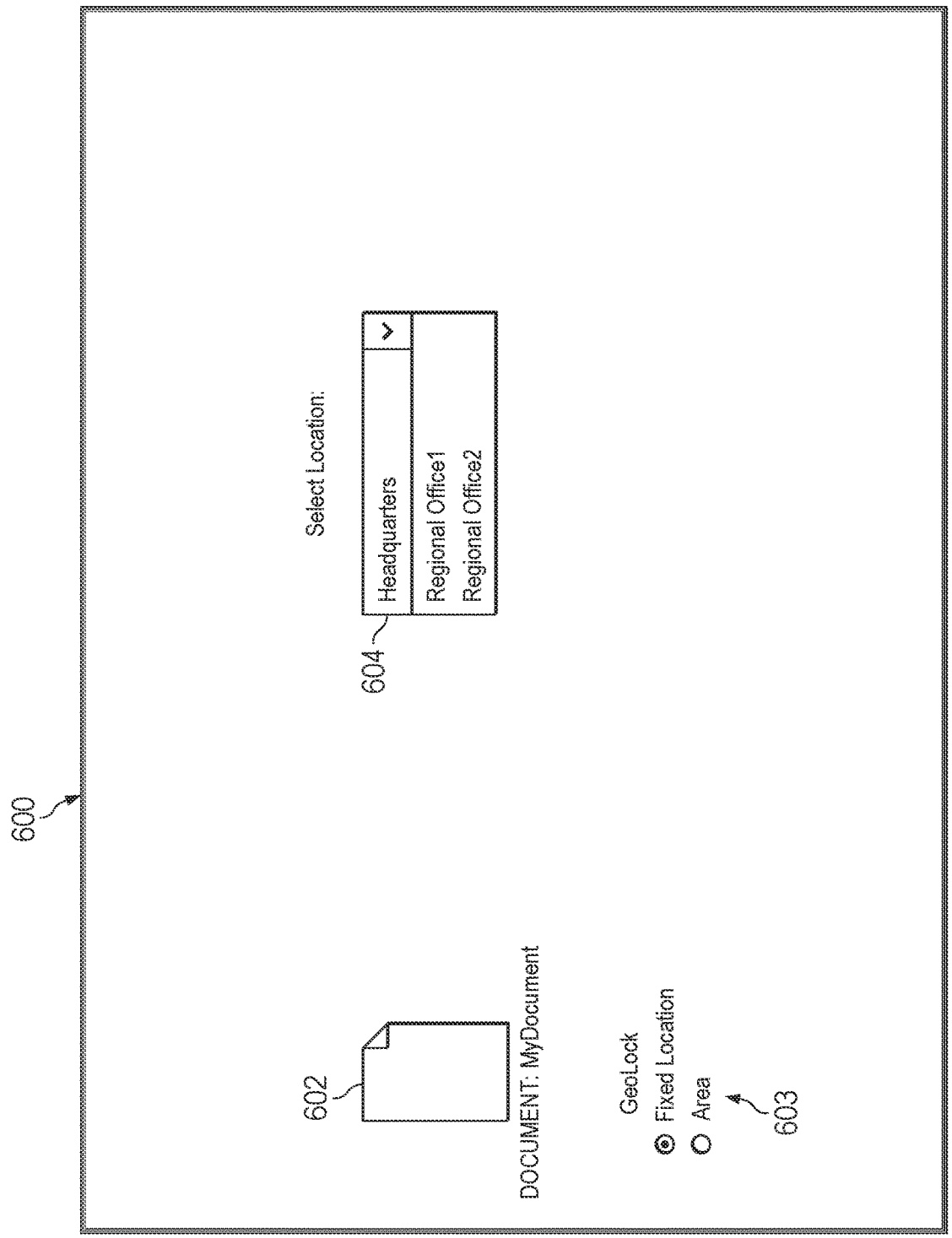
FIG. 6 is a diagrammatic representation of one embodiment of a user interface for specifying a geo-lock.
Figure 7:
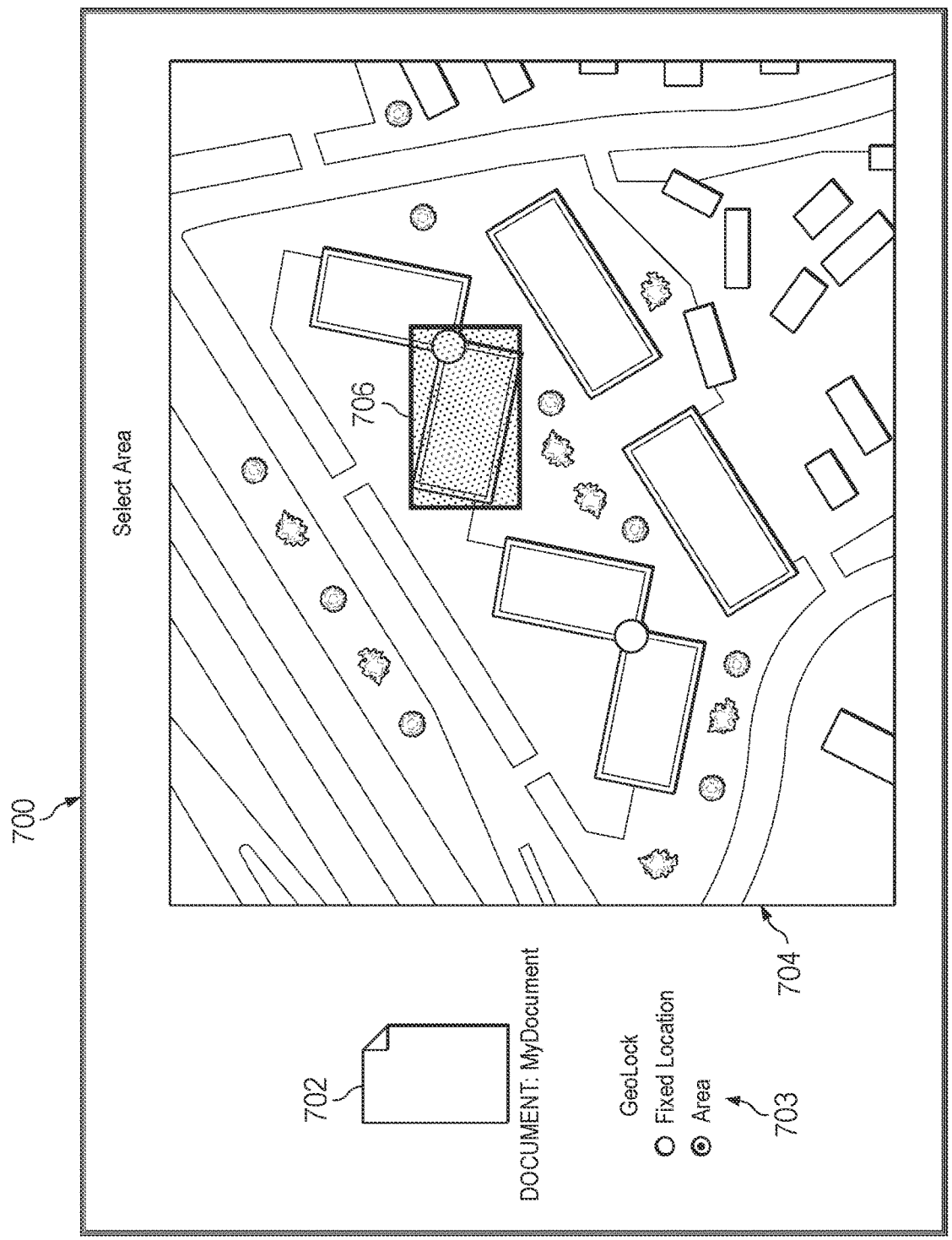
FIG. 7 is a diagrammatic representation of another embodiment of a user interface for specifying a geo-lock.

Geo-lock interface 114 allows a user to provide geo-lock definitions. A geo-lock definition may include, for example, an indication of a document(s) on which a geo-lock is to be asserted and geo-lock information indicating an allowed location(s) for the document(s). For example, geo-lock interface 114 may provide functionality to allow a user to identify documents and to provide geo-lock information for the identified documents. Geo-lock interface 114 may be configured to allow a user to select from a set of fixed locations. In addition, or in the alternative, geo-lock interface 114 may be configured to connect to location service 152 to receive geographic coordinates based on user interaction with the user interface. Example embodiments of user interfaces for providing a geo-lock definition are illustrated in FIG. 6 and FIG. 7.

Geo-lock assertion module 118 processes geo-lock definitions submitted via the interface 114 and asserts geo-locks on the identified documents based on the geo-lock information included in the geo-lock definitions. According to one embodiment, the geo-lock information for a document may include an indication of a fixed location. In another embodiment, the geo-lock information for a document may include a user-defined location expressed, for example, as coordinate locations of a bounding shape or expressed according to another format.

In some embodiments, asserting the geo-lock 108 on an associated document comprises storing received geo-lock information in appropriate fields of the document object 106 for the document. For example, geo-lock assertion module 118 may store a fixed location or user-defined location in appropriate fields of the document object 106 for the identified document. In some embodiments, a location may be expressed as a location name and geo-lock assertion module 118 stores the location name as the geo-lock 108. In another embodiment, geo-lock assertion module 118 stores geographic coordinates corresponding to the location name as the geo-lock 108. For example, geo-lock assertion module 118 may comprise a lock location map 120 configured with set of named locations (e.g., "headquarters," "New York Office," or other locations) and corresponding geographic coordinates for each named location, expressed, for example, as coordinate locations of a bounding shape or according to another format. Geo-lock assertion module 118 may use the lock location map (or other mechanism) to map a named location to the corresponding geographic coordinates and store the corresponding geographic coordinates as the geo-lock 108.

Asserting a geo-lock 108 may comprise generating a lock enforcement script and storing the lock enforcement script in the appropriate document object 106. As will be appreciated, various widely used document formats allow scripts to be embedded in a document, where the scripts will be run by when the document is opened. As such, lock assertion module 118 may include a script generator 122 to generate lock enforcement scripts according to the type of document on which the lock is being asserted. Lock assertion module 118 may thus embed a lock enforcement script in the document.

Turning now to geo-lock enforcement system 130, geo-lock enforcement system 130 may comprise interfaces 132, such as an object access interface 134, to provide functionality for accessing items in data store 104. Geo-Lock enforcement system 130 processes requests submitted via the interface 134 to enable a user to perform various operations, such as uploading items, downloading items, reserving items, editing content, searching and other operations. The interface functionality may be provided through any suitable mechanism including, but not limited to, a web application server exposing a REST API, a web page, a mobile application or through another mechanism.

Lock enforcement system 130 may include a lock location map 136 configured with set of named locations (e.g., "headquarters," "New York Office," or other location) and corresponding geographic coordinates for each named location, expressed, for example, as coordinate locations of a bounding shape or according to another format. Thus, when a document is requested via interface 134, object security system 102 may access the document object 106, determine the named location from geo-lock 108 and map the named location to geographic coordinates. In this example, lock location mapping is performed on the enforcement side rather than the lock assertion side.

Geo-lock enforcement system 130 may include a script generator 138. Script generator 138 may function similarly to script generator 122 except that, in this case, the lock enforcement script for a document is generated and embedded in the document on the enforcement side. Thus, when a document is requested via interface 134, object security system 102 may access the document object 106, determine a location from geo-lock 108, generate a script to enforce the location and embed the script in the requested document.

Geo-lock enforcement system 130 may comprise a target location mapper 140. Target location mapper 140 may be configured to map information about a target system for a document to geographic coordinates for the target. For example, target location mapper 140 may be configured to map IP addresses to geographic coordinates.

Geo-lock enforcement system 130 comprises a lock enforcement module 142 configured to determine a target location for a document and allow or block the access based on the geo-lock. The target location may be a location of the requesting system. The target location may be the location of a recipient system (an actual or intended recipient system). The target location may be a current location of the document (e.g., a location of an actual recipient system). In some embodiments, a system requesting to access a document may provide the target location. In other embodiments, the target location information may be requested from a target system. In some embodiments, lock enforcement module 142 may be configured to use information provided by or about the target system to request target location information from location service 152.

In some embodiments, at least a portion of lock enforcement module 142 may run on a target system such that lock enforcement module 142 may gather location information for the system. Further, lock enforcement module 142 may be configured to use the location API of location service 152 to determine the location of the target system (e.g., based on submitting information about the target system to location service 152).

It will be appreciated that many computing systems have in-built GPS chips which can precisely compute the location of the computing system. Accordingly, according to some embodiments, lock enforcement module 142 may be configured to determine the current location of a system from GPS data. Even if the computer system has a poor GPS system, lock enforcement module 142 may use Assisted GPS or Network Based Positioning to compute a current location with the help of internet-based servers.

In some embodiments, lock enforcement module 142 may be implemented, at least in part, via execution of a script embedded in a requested document (e.g., a script generated by script generator 122 or script generator 138). In some embodiments, lock enforcement module 142 may be implemented, at least in part, as a plug-in to a client application, such as a plug-in to a web browser, a word processor or other application.

In general, lock enforcement module 142 is configured to determine if the target location for a document is an allowed location specified in a geo-lock 108 on a document. If the target location is an allowed location, lock enforcement module 142 can allow access. If the target location is not an allowed location, lock enforcement module 142 can deny access, generate a notification or take another specified action. According to one embodiment, users (e.g., document authors, administrators) can be provided a notification if a document is accessed at a location which is outside of an allowed location. In various embodiments, determining if the target location is an allowed location may include determining if the target location matches or is within a specified fixed location or if the target location matches or is within a user-defined location.

It can be noted that geo-locking as described herein may be implemented in conjunction with other mechanisms for controlling access to or use of documents, such as access control lists, data loss prevention systems or other mechanisms.

Figure 2:
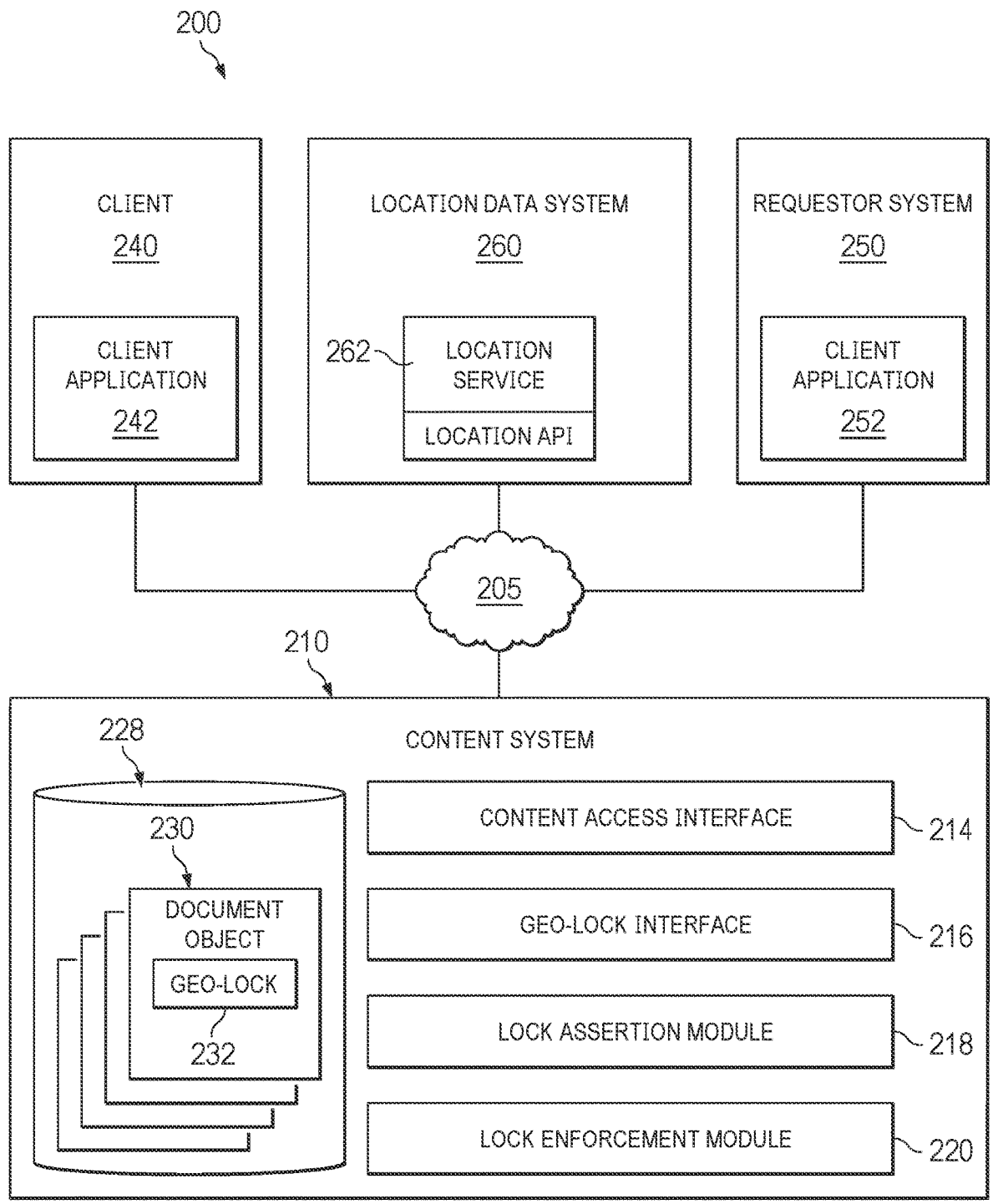
FIG. 2 is a diagrammatic representation of one embodiment of a system in which geo-locking may be implemented.
Figure 3:
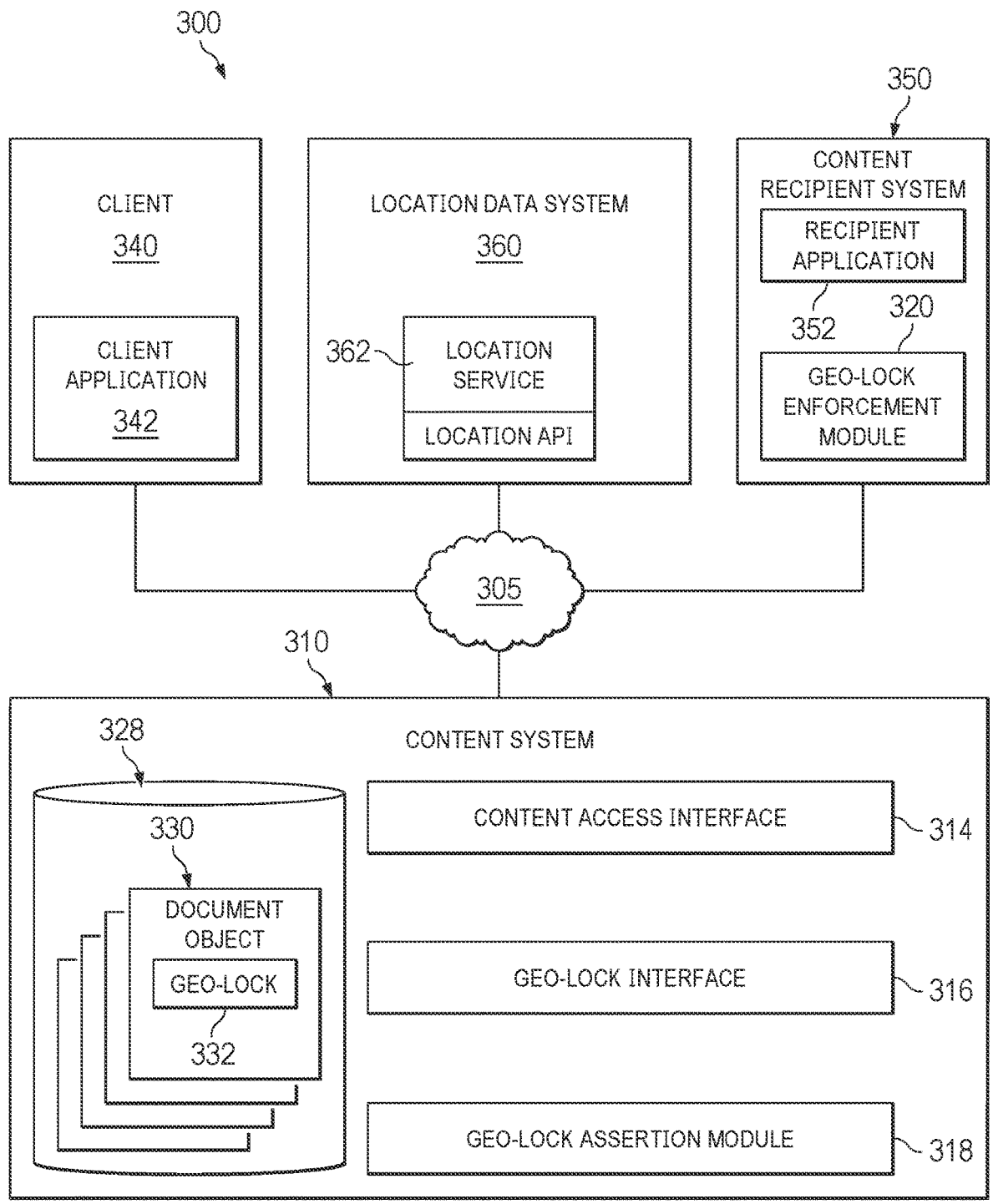
FIG. 3 is a diagrammatic representation of another embodiment of a system in which geo-locking may be implemented.
Figure 4:
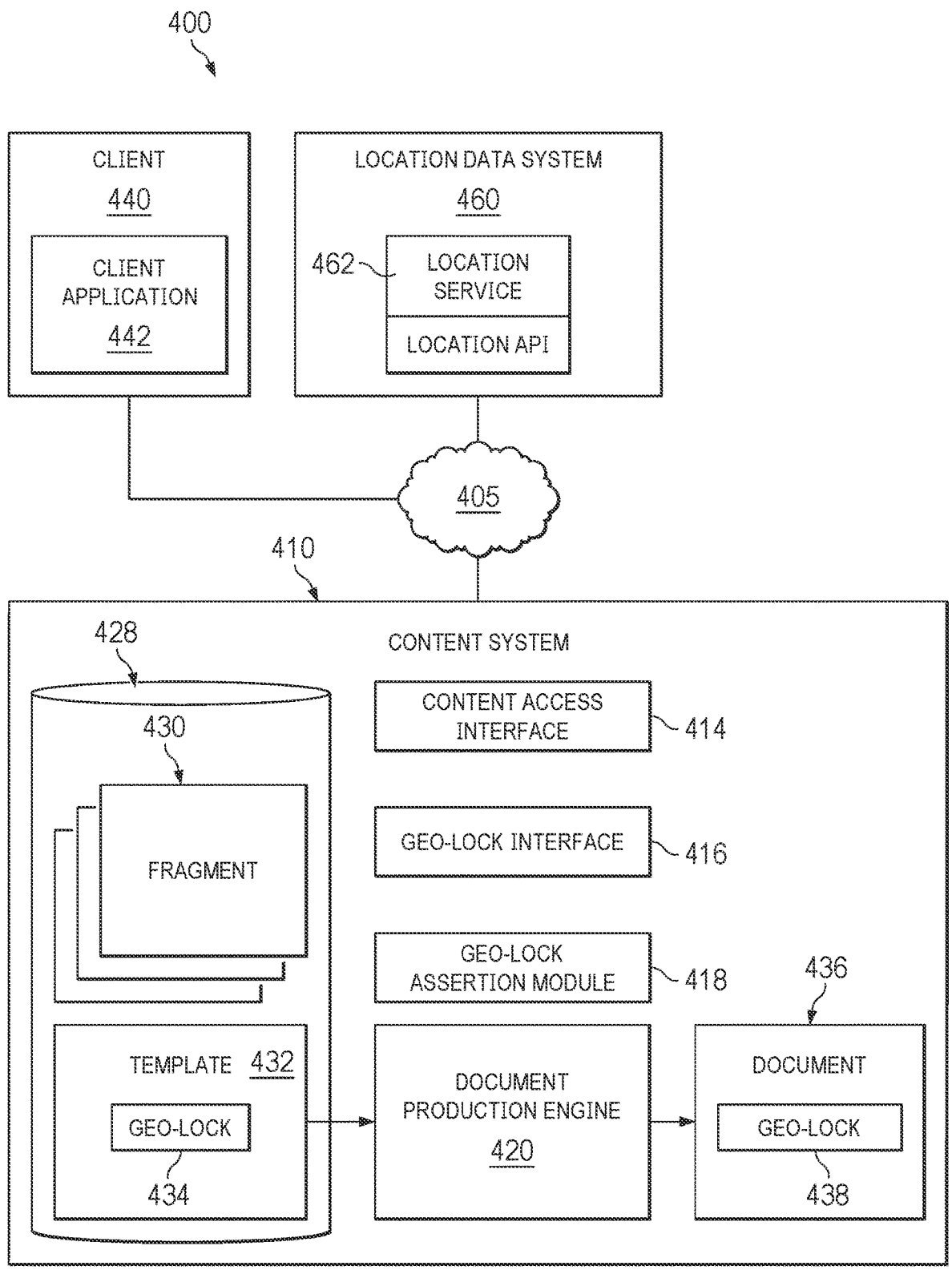
FIG. 4 is a diagrammatic representation of another embodiment of a system in which geo-locking may be implemented.
Figure 5:
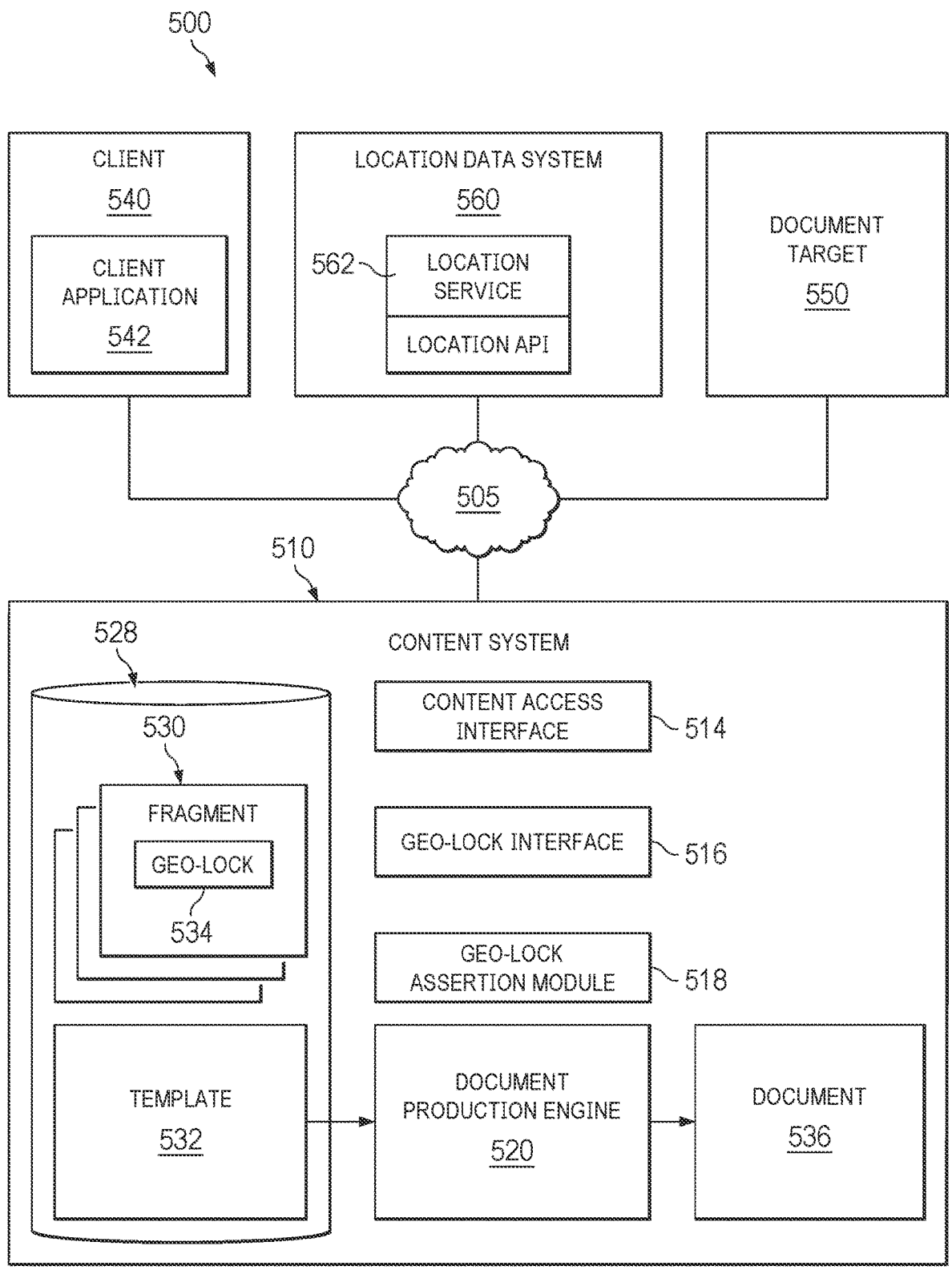
FIG. 5 is a diagrammatic representation of another embodiment of a system in which geo-locking may be implemented.

An object security system 102 can be implemented according to a variety of configurations. Various nonlimiting examples are discussed in conjunction with FIGS. 2-5. FIG. 2, for example, illustrates an embodiment in which a content system 210 acts as a lock assertion system and a lock enforcement system. FIG. 3 illustrates an embodiment in which a content system 310 acts as a lock assertion system and a recipient system 350 implements at least a portion of a lock enforcement system. FIG. 4 illustrates an embodiment in which a document production engine 420 acts as a portion of a lock assertion system. FIG. 5 illustrates an embodiment in which a document production engine 520 acts as a portion of a lock enforcement system.

Turning to FIG. 2, FIG. 2 is a diagrammatic representation of one embodiment of a system 200 comprising a network 205 that bi-directionally couples a content system 210 (e.g., a content management system), a first client system 240, a requestor system 250 and a location data system 260. Location data system 260 includes a location service 262 that provides location data to requesting applications. According to one embodiment, location service 262 may include an API that provides geographic map or geographic coordinate information to other applications. Location service 262 may be a commercially available service.

Content system 210 is configured to act as a lock assertion system and a lock enforcement system. Content system 210 includes a content access interface 214, which may be one example of object access interfaces 116, 134, geo-lock interface 216, which may be one example of geo-lock interface 114, lock assertion module 218 which may be one example of lock assertion module 118 and lock enforcement module 220, which may be one example of lock enforcement module 142.

Content system 210 includes a data store 228, which may include one or more file systems, databases or other data stores to store managed items. Data store 228 may provide an object-based data store in which documents (whole documents, document fragments) or other data resources are managed as a set of objects. Each document in data store 228 may thus be managed as a document object 230 that includes the document and associated metadata. In some embodiments, the document may be stored as a file. Geo-locks 232 may be asserted on documents.

Content access interface 214 provides functionality for accessing items in data store 228. Content system 210 processes requests submitted via the interface 214 to enable a user to perform various operations, such as uploading items, downloading items, reserving items, editing content, searching and other operations. Geo-lock interface 216 provides functionality to allow a user to provide a geo-lock definition. Geo-lock interface 216 may be configured to connect to location service 262 to receive geographic coordinates based on user interaction with the user interface. Examples of user interfaces for providing geo-lock definitions are illustrated in FIG. 6 and FIG. 7. The interface functionality of interfaces 214, 216 may be provided through any suitable mechanism including, but not limited to, a web application server exposing a REST API, a web page, a mobile application or through another mechanism.

A client application 242, such as a web browser or other client application, may thus interact with content system 210 to perform various operations with respect to documents. For example, a user may select a document and provide geo-lock information for the document. In some embodiments, the client application can be configured to interact with location service 262 to determine geographic coordinates for a user defined location area. In one embodiment, the client application may be configured to interact with location service 262 via a web page provided by content system 210.

Geo-Lock assertion module 218 processes the geo-lock definition submitted via the interface 216 and asserts a geo-lock 232 on the identified document based on the geo-lock definition. As discussed above, a geo-lock 232 may be asserted in a variety of ways. While not illustrated, geo-lock assertion module 218 may comprise a lock location map (e.g., lock location map 120 illustrated in FIG. 1) to map system defined name locations to geographic coordinates and/or a script generator (e.g., script generator 122) to generate a lock enforcement script.

A client application 252, such as a web browser or other client application, may interact with content system 210 to perform various operations with respect to documents. For example, a client application may request to access a document. Lock enforcement module 220 may allow, block or take other specified action based on the geo-lock 232 associated with the requested document.

According to various embodiments, client application 252 may be configured to provide location information for requestor system 250 and include the location of requestor system 250 in the request for a document. For example, client application 252 may be configured to determine the location of requestor system 250 using, for example, the location API of location service 262 to determine the location of the requestor system 250. Further, client application 252 may be configured to determine the location of requestor system 250 from GPS data. In some embodiments, client application 252 may use Assisted GPS or Network Based Positioning to compute a location with the help of internet-based servers. In any case, client application 252 may provide the location of requestor system 250 to content system 210. In another embodiment, lock enforcement module 220 may maintain information to allow lock enforcement module 220 to infer the location of requestor system 250. For example, enforcement module 220 may include a map of IP addresses to geographic locations or include other mechanisms to determine the geographic location of requestor system 250.

Lock enforcement module 220 determines if the location of requestor system 250 is an allowed location as specified by a geo-lock 232 for the requested document. In some embodiments, this may involve mapping a named location specified in geo-lock 232 to an area. In some embodiments, then, lock enforcement module 220 may include a lock location map (e.g., lock location map 136 of FIG. 1).

If the lock enforcement module 220 determines that requestor system 250 is at an allowed location as specified by the geo-lock 232 for the requested document, the requested document can be returned to application 242. If, on the other hand, lock enforcement module 220 determines that requestor system 250 is not at an allowed location as specified by the geo-lock 232 for the requested document, lock enforcement module 220 may block the request. In the alternative or in addition, lock enforcement module 220 may send a notification to a user that the document is being accessed from outside of the allowed locations for the documents.

FIG. 3 is a diagrammatic representation of one embodiment of a system 300 comprising a network 305 that bi-directionally couples a content system 310 (e.g., a content management system), a client system 340, a recipient system 350 and a location data system 360. Location data system 360 includes a location service 362 that provides location data to requesting applications. According to one embodiment, location service 362 may include an API that provides geographic map or geographic coordinate information to other applications. Location service 362 may be a commercially available service.

Content system 310 is configured to act as a lock assertion system. At least a portion of a lock enforcement system, however, is implemented at a recipient system 350. Recipient system 350 may be any system that receives a geo-locked object (e.g., a geo-locked document). For example, recipient system 350 may be a requestor system that requests and receives a geo-locked document. As another example, recipient system 350 may be a system to which content is sent, such a system that receives an email with a geo-locked document attached. As yet another example, recipient system 350 may be an intermediate server through which a document passes, such as an email server through which an email with a geo-locked document attached passes.

Content system 310 includes a content access interface 314, which may be one example of object access interfaces 116, 134, geo-lock interface 316, which may be one example of geo-lock interface 114, lock assertion module 318 which may be one example of lock assertion module 118. A lock enforcement module 320, which may be one example of lock enforcement module 142, executes at a recipient system 350.

Content system 310 includes a data store 328, which may include one or more file systems, databases or other data stores to store managed items. Data store 328 may provide an object-based data store in which documents (whole documents, document fragments) or other data resources are managed as a set of objects. Each document in data store 328 may thus be managed as a document object 330 that includes the document and associated metadata. In some embodiments, the document may be stored as a file. Geo-locks 332 may be asserted on documents.

Content access interface 314 provides functionality for accessing items in data store 328. Content system 310 processes requests submitted via the interface 314 to enable a user to perform various operations, such as uploading items, downloading items, reserving items, editing content, searching and other operations. Geo-lock interface 316 provides functionality to allow a user to provide a geo-lock definition. Geo-lock interface 316 may be configured to connect to location service 362 to receive geographic coordinates based on user interaction with the user interface. Examples of user interfaces for providing a geo-lock definition are illustrated in FIG. 6 and FIG. 7. The interface functionality of interfaces 314, 316 may be provided through any suitable mechanism including, but not limited to, a web application server exposing a REST API, a web page, a mobile application or through another mechanism.

A client application 342, such as a web browser or other client application, may thus interact with content system 310 to perform various operations with respect to documents. For example, a user may select a document and provide geo-lock information for the document. In some embodiments, the client application can be configured to interact with location service 362 to determine geographic coordinates for a user defined location area. In one embodiment, the client application may be configured to interact with location service 362 via a web page provided by content system 310.

Geo-Lock assertion module 318 processes the geo-lock definition submitted via the interface 316 and asserts a geo-lock 332 on the identified document based on the geo-lock definition. As discussed above, a geo-lock 332 may be asserted in a variety of ways. While not illustrated, geo-lock assertion module 318 may comprise a lock location map (e.g., lock location map 120 illustrated in FIG. 1) to map system defined name locations to geographic coordinates and/or a script generator (e.g., script generator 122) to generate a lock enforcement script. Thus, according to one embodiment, each geo-locked document may have a lock enforcement script embedded in the document file or otherwise associated with the geo-locked document. In other embodiments, a script may be embedded in or otherwise associated with a geo-locked document when the geo-locked document is requested (e.g., by a script generator 138).

Recipient application 352 may be an application associated with a file-type of a geo-locked document or an application otherwise capable of opening a geo-locked document. In one embodiment, for example, recipient application 352 may be a document editing program (e.g., a word processing program or other program) at an end-user's computer. In another embodiment, recipient application 352 may be an application invoked by an email server to open email attachments. The recipient application 352 may invoke lock enforcement module 320 to determine whether to allow the geo-locked document to be opened. In one embodiment, lock enforcement module 320 may be a custom plug-in installed in recipient application 352. In another embodiment, lock enforcement module 320 is embodied as a script embedded in the geo-locked document, where the script is executed by recipient application 352 when recipient application 352 opens the document.

Lock enforcement module 320 is configured to fetch the current location of recipient system 350. According to one embodiment, lock enforcement module 320 may be configured to use the location API of location service 362 to determine the location of the recipient system 350. According to another embodiment, lock enforcement module 320 may be configured to determine the location of recipient system 350 from GPS data provided by a GPS chip of recipient system 350. In some embodiments, lock enforcement module 320 may use Assisted GPS or Network Based Positioning to compute a location with the help of internet-based servers.

Lock enforcement module compares the current location (the location of recipient system 350) with allowed locations specified in the geo-lock for the document and, if the current location is an allowed location, allows opening of the document to continue. If the current location is not an allowed location, lock enforcement module 320 may prevent the document from being opened, generate a notification that the document is being opened outside of an allowed location or take other specified action.

Implementing lock enforcement module as a custom plug-in of a document application or embedded script in a geo-locked document (e.g., in a word processing document, a portable document format document of another document type that supports embedded scripts) can provide a mechanism to enforce a geo-lock outside of the infrastructure of the entity that controls content system 310.

According to one embodiment, a document production engine can use geo-locking to enhance the security and privacy aspects related to document sharing. FIG. 4 is a diagrammatic representation of one embodiment of a system 400 comprising a network 405 that bi-directionally couples a content system 410 (e.g., a content management system), a client system 440 and a location data system 460. Location data system 460 includes a location service 462 that provides location data to requesting applications. According to one embodiment, location service 462 may include an API that provides geographic map or geographic coordinate information to other applications. Location service 462 may be a commercially available service. Content system 410, in accordance with one embodiment, acts as a geo-lock assertion system. Content system 410 may also include a geo-lock enforcement system (not illustrated).

In various embodiments, content system 410 includes a document production engine 420 that is configured to assemble document fragments 430 into a final document 436 based on a template 432, which may be a type of document. According to one embodiment, document production engine may be a document production engine further adapted to support geo-locking as discussed herein.

Content system 410 includes a data store 428, which may include one or more file systems, databases or other data stores to store managed items. Data store 428 may provide an object-based data store in which documents (whole documents, document fragments), templates or other data resources are managed as a set of objects. Each document or template may be managed as an object that includes the document or template and associated metadata. In some embodiments, a document or template may be stored as a file. In the embodiment illustrated, fragments 430 and template 432 may be managed as a set of objects. A geo-lock 434 may be asserted on template 432.

Content access interface 414, which may be an example of object access interface 116, provides functionality for accessing items in data store 428. Content system 410 processes requests submitted via the interface 414 to enable a user to perform various operations, such as uploading items, downloading items, reserving items, editing content, searching and other operations. In one embodiment, content access interface 414 may provide an interface that allows a user to author a template 432. Geo-lock interface 416, which may be one example of geo-lock interface 114, provides functionality to allow a user to provide a geo-lock definition. Geo-lock interface 416 may allow a user to identify a template 432 and provide geo-lock information for the identified template. Geo-lock interface 416 may be configured to connect to location service 462 to receive geographic coordinates based on user interaction with the user interface. Examples of user interfaces for providing a geo-lock definition are illustrated in FIG. 6 and FIG. 7. The interface functionality of interfaces 414, 416 may be provided through any suitable mechanism including, but not limited to, a web application server exposing a REST API, a web page, a mobile application or through another mechanism.

A client application 442, such as a web browser or other client application, may thus interact with content system 410 to perform various operations with respect to documents. For example, a user may select template 432 and provide geo-lock information for template 432. In some embodiments, the client application 442 can be configured to interact with location service 462 to determine geographic coordinates for a user defined location area. In one embodiment, the client application may be configured to interact with location service 462 via a web page provided by content system 410.

Geo-Lock assertion module 418, which may be one example of lock assertion module 118, processes the geo-lock definition submitted via the interface 416 and asserts a geo-lock 434 on the identified template 432 based on the geo-lock information. As discussed above, a geo-lock 434 may be asserted in a variety of ways. While not illustrated, geo-lock assertion module 418 may comprise a lock location map (e.g., lock location map 120 illustrated in FIG. 1) to map system defined name locations to geographic coordinates and/or a script generator (e.g., script generator 122) to generate a lock enforcement script.

Document production engine 420 is configured to generate a document 436 from fragments 430 according to template 432. When document production engine 420 processes template 432, document production engine may access geo-lock 434 to determine locations specified by geo-lock 434. When document production engine outputs document 436 based on template 432, document production engine 420 asserts geo-lock 438 on document 436, where geo-lock 438 specifies the same locations as geo-lock 434 associated with the template 432 from which document 436 was generated. Geo-lock 438 may be enforced as discussed above or according to another lock enforcement scheme.

FIG. 5 is a diagrammatic representation of one embodiment of a system 500 comprising a network 505 that bi-directionally couples a content system 510 (e.g., a content management system), a first client system 540, a target system 550 and a location data system 560. Location data system 560 includes a location service 562 that provides location data to requesting applications. According to one embodiment, location service 562 may include an API that provides geographic map or geographic coordinate information to other applications. Location service 562 may be a commercially available service. Content system 510, in accordance with one embodiment, acts as a geo-lock assertion and enforcement system.

In various embodiments, content system 510 includes a document production engine 520 that is configured to assemble document fragments 530 into a final document 536 based on a template 532, which may be a type of document. According to one embodiment, document production engine may be a document production engine adapted to supported geo-locking as discussed herein. According to another embodiment, document production engine 520 may be a page generator configured to generate a web page document using page fragments.

Content system 510 includes a data store 528, which may include one or more file systems, databases or other data stores to store managed items. Data store 528 may provide an object-based data store in which documents (whole documents, document fragments), templates or other data resources are managed as a set of objects. Each document or template may be managed as an object that includes the document or template and associated metadata. In some embodiments, a document or template may be stored as a file. In the embodiment illustrated, fragments 530 and template 532 may be managed as a set of objects. Fragments 530 may have associated geo-locks 534.

Content access interface 514, which may be an example of object access interface 116, provides functionality for accessing items in data store 528. Content system 510 processes requests submitted via the interface 514 to enable a user to perform various operations, such as uploading items, downloading items, reserving items, editing content, searching and other operations. In one embodiment, content access interface 514 may provide an interface that allows a user to author a template 532. Geo-lock interface 516, which may be one example of geo-lock interface 114, provides functionality to allow a user to provide a geo-lock definition. Geo-lock interface may allow a user to identify fragments 530 and provide geo-lock information for the identified fragments. Geo-lock interface 516 may be configured to connect to location service 562 to receive geographic coordinates based on user interaction with the user interface. Examples of user interfaces for providing a geo-lock definition are illustrated in FIG. 6 and FIG. 7. The interface functionality of interfaces 514, 516 may be provided through any suitable mechanism including, but not limited to, a web application server exposing a REST API, a web page, a mobile application or through another mechanism.

A client application 542, such as a web browser or other client application, may thus interact with content system 510 to perform various operations with respect to documents. For example, a user may select a fragment 530 and provide geo-lock information for the fragment 530. In some embodiments, the client application 542 can be configured to interact with location service 562 to determine geographic coordinates for a user defined location area. In one embodiment, the client application may be configured to interact with location service 562 via a web page provided by content system 510.

Geo-lock assertion module 518 processes the geo-lock definition submitted via the interface 516 and asserts a geo-lock 534 on the identified fragment 530 based on the geo-lock definition. As discussed above, a geo-lock 534 may be asserted in a variety of ways. While not illustrated, geo-lock assertion module 518 may comprise a lock location map (e.g., lock location map 120 illustrated in FIG. 1) to map system defined name locations to geographic coordinates and/or a script generator (e.g., script generator 122) to generate a lock enforcement script.

Document production engine 520 is configured to generate a document 536 from fragments 530 according to template 532. In accordance with one embodiment, document production engine 520 may receive a request to generate document 536 for a specified target system 550. In various embodiments, document production engine 520 may receive location information for the target, such as coordinates of target system 550 or location information that can be mapped to coordinates for target system 550. When generating document 536 destined for target system 550, document production engine 520 may determine a list of potential fragments 530 and compare the geographic location for target system 550 to the geographic locations specified in the geo-locks 534 for those fragments. Document production engine 520 can be configured to select only those fragments 530 for which the geographic location determined for target system 550 falls within a geographic location specified in the associated geo-lock 534 and generate document 536 using the selected fragments.

While primarily described in terms of security with respect to a requested document, embodiments may use geo-locks for a variety of purposes, such as the selection of content to be targeted at a location. FIG. 6 illustrates one embodiment of a user interface 600 provided by a geo-lock interface (e.g., geo-lock interface 114, 216, 316, 416, 516) at a client system (e.g., client system 240, 340, 440, 540). User interface 600 can allow a user to define a geo-lock. Document 602 of user interface 600 indicates a document selected by the user. User interface 600 provides a control 603 to allow the user to select a type of geo-lock to assert on the document. In this example, the user has selected a "Fixed Location" geo-lock and, as such, interface 600 provides a control 604 to allow the user to select from a list of defined locations. Based on user interaction with user interface 600, the client system can send an indication of the document (e.g., by name, object id or other identifier) and set of geo-lock information for the document to the object security system 102, content system 210, 310, 410, 510. The geo-lock information may include, for example, the type of geo-lock and a location indicator (e.g., location name, location coordinates or other data).

FIG. 7 illustrates one embodiment of a user interface 700 provided by a geo-lock interface (e.g., geo-lock interface 114, 216, 316, 416, 516) at a client system (e.g., client system 240, 340, 440, 540). User interface 700 can allow a user to define a geo-lock. Document 702 represents a document selected by a user. User interface 700 provides a control 703 to allow the user to select a type of geo-lock to assert on the document. In this example, the user has selected to define an ad hoc location, represented as "Area". Based on the user's selection to define an area, user interface 700 is updated to provide a map tool 704, such as a map widget. The client application may execute code (e.g., such as script of a web page or other code) to connect to a location service (e.g., location service 152, 262, 362, 462, 562) and provide a map. The user may designate an area using the map, such as by selecting a rectangular area of the map. As will be appreciated, the location service can return coordinates for the area within selection box 706 or other selection area.

Based on user interaction with user interface 700, the client system can send an indication of the document (e.g., by name, object id or other identifier) and set of geo-lock information for the document to the object security system 102, content system 210, 310, 410, 510. The geo-lock information may include, for example, the type of geo-lock and coordinate information for the selected area. While, in the illustrated embodiment, the user defines an ad hoc geographic location as a rectangle, in other embodiments may allow a user to define an ad hoc geographic location using circles, other polygons or complex shapes.

In some embodiments, the user interface may allow a user to select multiple fixed locations and/or define multiple ad hoc geographic locations for a geo-lock.

Figure 8:
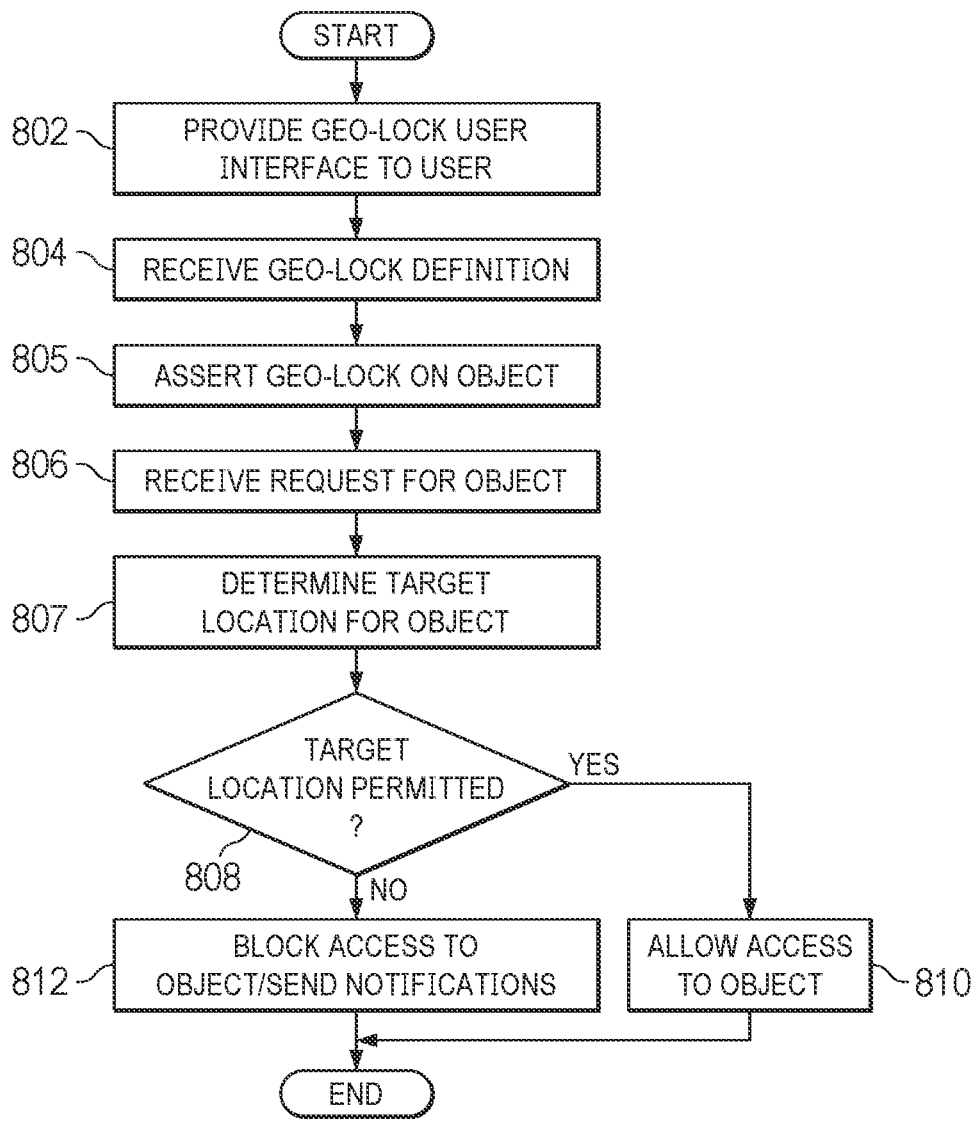
FIG. 8 is a flow chart of one embodiment of asserting and enforcing a geo-lock.

FIG. 8 is a flow chart illustrating one embodiment of asserting and enforcing a geo-lock. One or more steps of FIG. 8 may be performed by a geo-lock assertion system 110 or a geo-lock enforcement system 130. One or more steps of FIG. 8 may be performed by a content system 210, 310, 410, 510 that provides a geo-lock assertion system or geo-lock enforcement system. At step 802, a geo-lock assertion system may provide a geo-lock user interface, such as a web page or other interface, to a user. At step 804, the geo-lock system receives a definition of a geo-lock comprising an indication of an object and geo-lock information associated with the object. The indication of an object and geo-lock information associated with the object may be based on user interaction with the geo-lock user interface. The indication of an object may include, in various embodiments, an indication of a document on which a geo-lock is to be asserted.

At step 805, the geo-lock assertion system asserts a geo-lock on the object indicated in step 804 using the geo-lock information received in step 804. Asserting the geo-lock on an associated object may comprise storing received geo-lock information in appropriate fields of the object. For example, asserting the geo-lock on an associated object may comprise storing a fixed location or user-defined location in appropriate fields of a document object.

According to one embodiment, a fixed location may be expressed as a location name. As such, step 805 may include storing the location name as the geo-lock. In another embodiment, step 805 may include mapping a named location to a set of coordinates and storing the coordinates in appropriate fields of the object. Step 805 may also include storing coordinates for an ad hoc geographic location in the object.

In various embodiments, asserting a geo-lock may comprise generating a lock enforcement script and storing the lock enforcement script in the appropriate document object. Step 805 may include, for example, embedding a lock enforcement script in a document.

At step 806, a geo-lock enforcement system receives a request to access a geo-locked document. At step 807, the geo-lock enforcement system determines a target location for an object. The target location may be the location of the system that requested the object, a recipient system or other system. In one embodiment, determining the target location may include mapping information known about a target system to geographic coordinates. For example, the IP address of a target system may be mapped to geographic coordinates. In another embodiment, the location API of location service 152, 262, 362, 462, 562 may be used to determine the location of the requestor system 250. In other embodiments, GPS data may be collected from a GPS at the target system. In some embodiments, Assisted GPS or Network Based Positioning may be used to compute a location with the help of internet-based servers.

At step 808, the geo-lock enforcement system determines if the target location is an allowed location. For example, the coordinates of the target location can be compared to the coordinates of the fixed location or ad hoc geographic location specified in the geo-lock. If the coordinates of the target location are within a fixed location or ad hoc geographic location specified in the geo-lock of the object, the geo-lock enforcement system can allow access to the object (step 810). If the coordinates of the target location are not within any fixed location or ad hoc geographic location specified in the geo-lock of the object, the geo-lock enforcement system may block access to the object (step 812). In addition, or in the alternative, the geo-lock enforcement system can generate a notification that the object is being accessed from a prohibited location.

FIG. 8 is merely an illustrative example and the disclosed subject matter is not limited to the ordering of or number of steps illustrated. Embodiments may implement additional steps or alternative steps, omit steps, or repeat steps.

Figure 9:
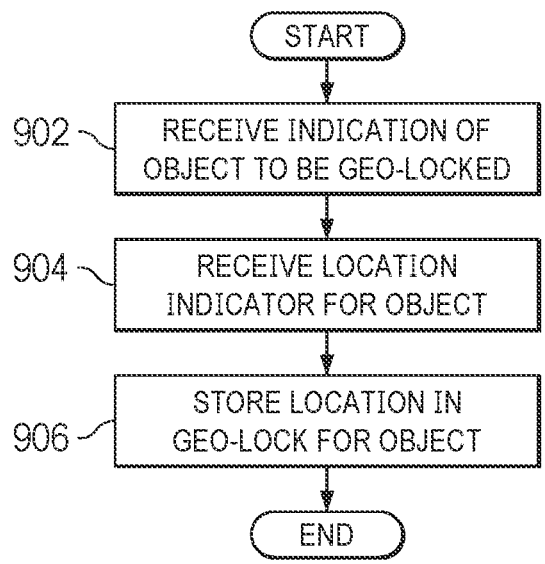
FIG. 9 is a flow chart of one embodiment of a method for receiving a geo-lock definition and asserting a geo-lock.

FIG. 9 is a flow chart of one embodiment of receiving a geo-lock definition and asserting a geo-lock. FIG. 9 may be an embodiment of steps 804 and 805 of FIG. 8. At step 902, the geo-lock assertion system receives an indication of an object on which a geo-lock is to be asserted. The indication of an object may include, in various embodiments, an indication of a document on which a geo-lock is to be asserted. At step 904, the geo-lock assertion system receives a location indicator for a geo-lock to be asserted on the object. The indication of location may include, for example, the name of a fixed location, geographic coordinates or other data indicative of a geographic location. At step 906, the geo-lock assertion system stores a location in the geo-lock for the object. Storing the location may comprise storing the location name, geographic coordinates or other data indicative of a geographic location in the geo-lock of an object. Storing the location may comprise mapping a location name to coordinates for the location.

FIG. 9 is merely an illustrative example and the disclosed subject matter is not limited to the ordering of or number of steps illustrated. Embodiments may implement additional steps or alternative steps, omit steps, or repeat steps.

Figure 10:
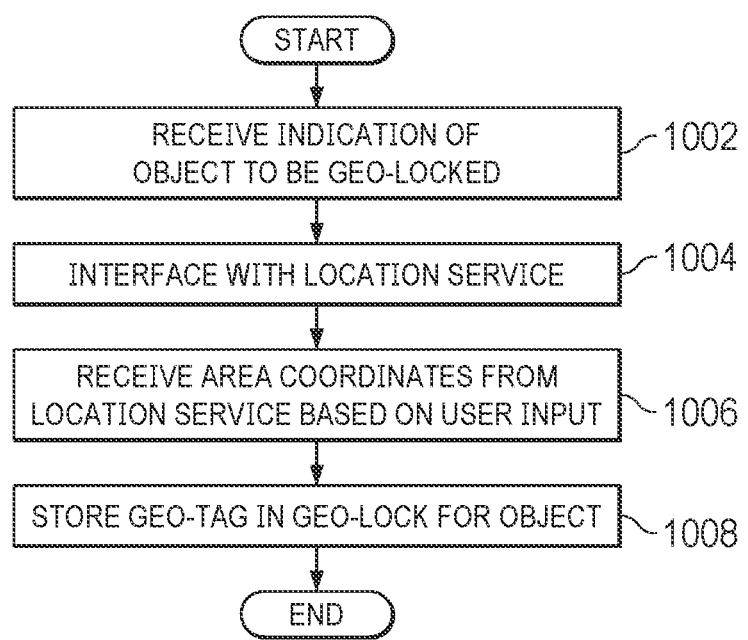
FIG. 10 is a flow chart of another embodiment of a method for receiving a geo-lock definition and asserting a geo-lock.

FIG. 10 is a flow chart of another embodiment of receiving a geo-lock definition and asserting a geo-lock. FIG. 10 may represent an embodiment of steps 804 and 805 of FIG. 8. At step 1002, the geo-lock assertion system receives an indication of an object on which a geo-lock is to be asserted. The indication of an object may include, in various embodiments, an indication of a document on which a geo-lock is to be asserted. At step 1004, a client application interfaces with a location service (e.g., location service 152, 262, 362, 462, 562) to provide a map to a user via a geo-lock user interface (e.g., a web page). Based on user interaction with the user interface, the user can select an ad hoc geographical location (e.g., by selecting an area of the map) and the location service can provide geographic coordinate data for the selected area. In some embodiments, a location service may provide a geo-tag for the selected area. At step 1006 geographic coordinates for a user-specified area can be received from the location service. At step 1008, the geo-lock assertion system can store the geographic coordinates in the geo-lock for the object indicated at step 1002. For example, the geo-lock assertion system may store a geo-tag in the geo-lock.

FIG. 10 is merely an illustrative example and the disclosed subject matter is not limited to the ordering of or number of steps illustrated. Embodiments may implement additional steps or alternative steps, omit steps, or repeat steps.

Figure 11:
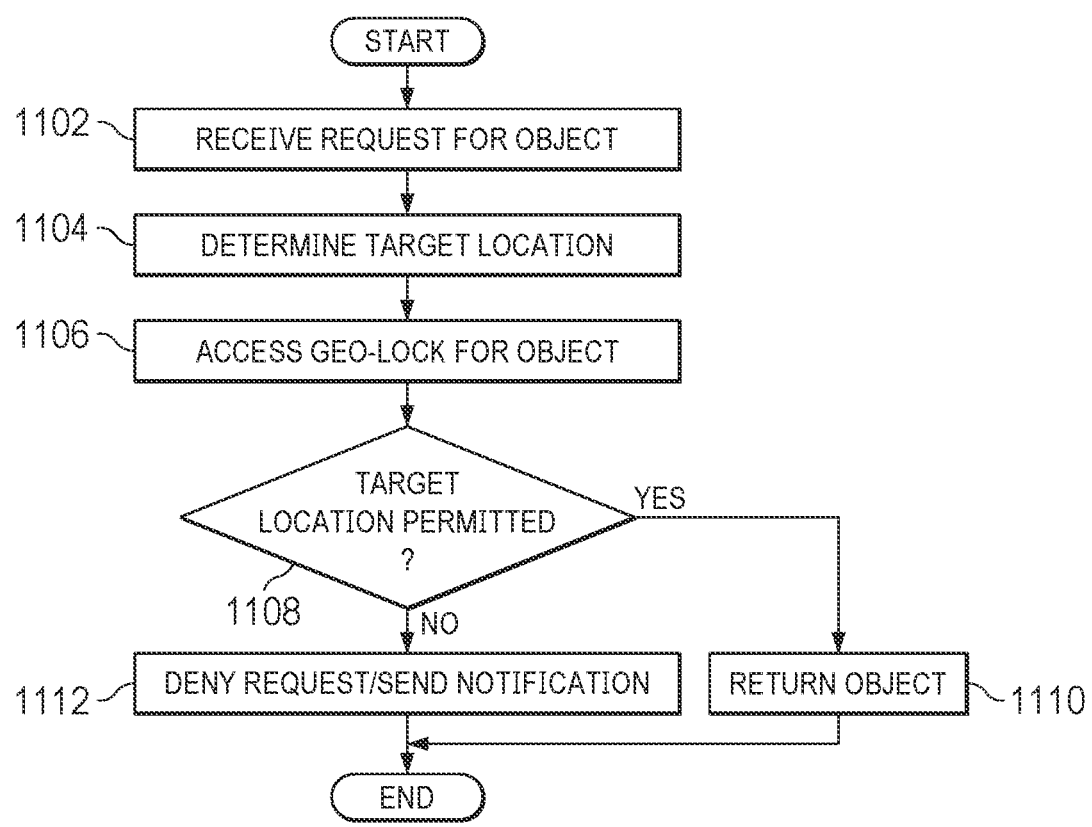
FIG. 11 is a flow chart of one embodiment of a method for enforcing a geo-lock.

FIG. 11 is a flow chart of one embodiment of a method for a geo-lock enforcement system providing centralized enforcement of a geo-lock. FIG. 11 may represent an embodiment of steps 806-812 of FIG. 8. At step 1102, the geo-lock enforcement system receives a request for an object (e.g., a request for a document). At step 1104, the geo-lock enforcement system determines a target location for an object. The target location may be the location of the system that requested the object, a recipient system or other system. In one embodiment, determining the target location may include mapping information known about a target system to geographic coordinates. For example, the IP address of a target system may be mapped to geographic coordinates. In another embodiment, location information may be provided by the requesting system, such as GPS data, available Wi-Fi networks or other location information. In some embodiments, location information for a target system may be provided to a location service and the coordinates returned by the location service used as the target location.

At step 1106, the geo-lock enforcement system accesses the geo-lock associated with the requested object. At step 1108, the geo-lock enforcement system determines if the target location is an allowed location. For example, the coordinates of the target location can be compared to the coordinates of a fixed location or ad hoc geographic location specified in the geo-lock. If the coordinates of the target location are within a fixed location or ad hoc geographic location specified in the geo-lock of the object, the geo-lock enforcement system can return the requested object to the requesting system (step 1110). If the coordinates of the target location are not within any fixed location or ad hoc geographic location specified in the geo-lock of the object, the geo-lock enforcement system can block access to the object (step 1112). In addition, or in the alternative, the geo-lock enforcement system may generate a notification that the object is being accessed from a prohibited location.

FIG. 11 is merely an illustrative example and the disclosed subject matter is not limited to the ordering of or number of steps illustrated. Embodiments may implement additional steps or alternative steps, omit steps, or repeat steps.

Figure 12:
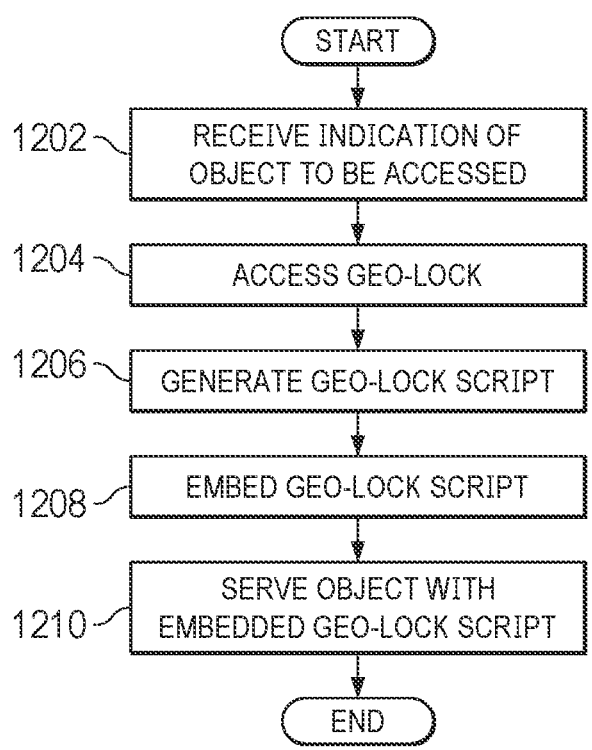
FIG. 12 is a flow chart of one embodiment of a method for embedding a geo-lock in a document.

FIG. 12 is a flow chart of one embodiment of a method for a geo-lock enforcement system to respond to a request for an object with an object having an embedded lock enforcement script. At step 1202, a geo-lock enforcement system receives a request for an object (e.g., a request for a document) is received. At step 1204, the geo-lock enforcement system accesses the geo-lock associated with the requested object. At step 1206, the geo-lock enforcement system generates a lock enforcement script using the location information from the geo-lock and, at step 1208, embeds the script in the requested object. For example, the geo-lock enforcement system may embed the script in a document file (e.g., a word processing document file or other file). At step 1210, the geo-lock enforcement system serves the object with embedded script to the requestor.

FIG. 12 is merely an illustrative example and the disclosed subject matter is not limited to the ordering of or number of steps illustrated. Embodiments may implement additional steps or alternative steps, omit steps, or repeat steps.

Figure 13:
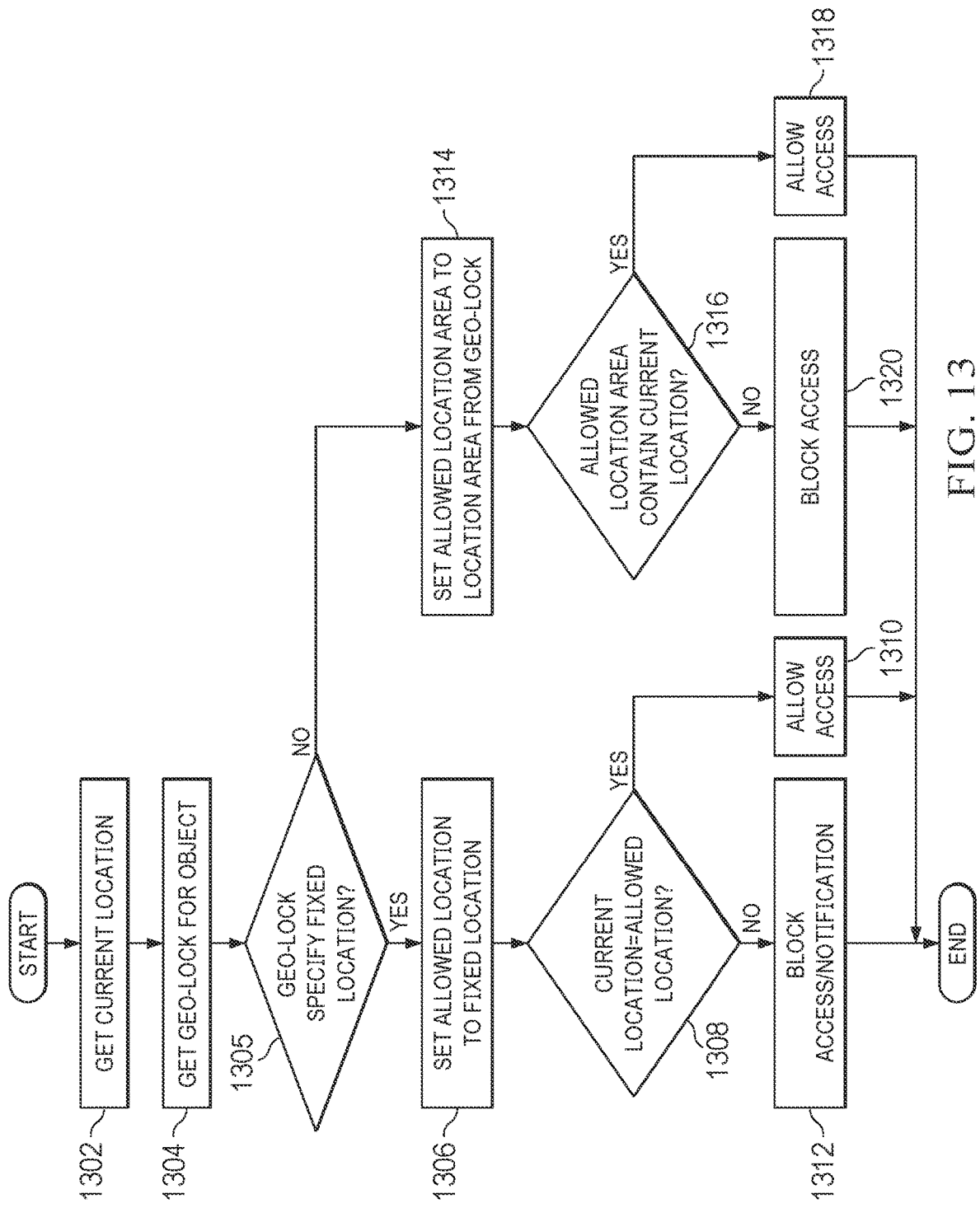
FIG. 13 is a flow chart of another embodiment of enforcing a geo-lock.

FIG. 13 is a flow chart illustrating one embodiment of a method for enforcing a geo-lock. FIG. 13 may represent one embodiment of steps 807-812 of FIG. 8. The steps of FIG. 13, according to various embodiments, may be implemented at a recipient system (e.g., through execution of an embedded script, document application plug-in or other code).

At step 1302, a lock enforcement module determines a current location of the system on which the module is executing. According to one embodiment, the lock enforcement module may be configured to use a location API of location service to determine the location of the current location. According to another embodiment, the lock enforcement module may be configured to determine the current location from GPS data provided by a GPS chip of the local system. In some embodiments, the lock enforcement module may use Assisted GPS or Network Based Positioning to compute a location with the help of internet-based servers.

At step 1304, the lock enforcement module retrieves the geo-lock for the object. This may involve reading metadata of a document, fetching the geo-lock from an object security system 102 or content system 210, 310, 410, 510, reading variables set in a script or otherwise accessing the geo-lock.

At step 1305, it is determined if the geo-lock specifies a fixed location. If so, control branches to step 1306, otherwise control branches to step 1314. At step 1306, an Allowed Location is set to the fixed location specified in the geo-lock. At step 1308, the lock enforcement module determines if the current location of the local system is within the Allowed Location. If so, access to the document is allowed (step 1310). Otherwise, access may be blocked, or other action taken, such as a notification generated (step 1312).

At step 1314, an Allowed Location Area is set to a location area specified in the geo-lock. At step 1316, the lock enforcement module determines if the current location of the local system is within the Allowed Location Area. If so, access to the document is allowed (step 1318). For example, a document application may be permitted to continue opening a document. Otherwise, access may be blocked, or other action taken, such as a notification generated (step 1320).

FIG. 13 is merely an illustrative example and the disclosed subject matter is not limited to the ordering of or number of steps illustrated. Embodiments may implement additional steps or alternative steps, omit steps, or repeat steps.

FIG. 14 provides pseudo-code for one embodiment of lock enforcement, such as implemented by a script. In the embodiment of FIG. 14, the lock enforcement module determines if a geo-lock is enabled on the document (or other object) for a fixed location or a user-defined area. The lock enforcement module also gets the current location of the document (designated currentlocation). If the geo-lock is enabled for a fixed location, the lock enforcement module obtains the fixed location (designated allowedLocation) and converts the location to a datatype for comparison to the current location. If the current location is an allowed location, the lock enforcement module allows access to proceed. Otherwise, the lock enforcement module blocks access, sends a notification or takes another programmed action.

If the geo-lock is enabled for an area, the lock enforcement module obtains the allowed location area (designated allowedLocationArea) and converts the location area to a datatype for comparison to the current location. The geo-lock enforcement module determines if the allowed location area contains the current location. If the allowed location area contains the current location, the lock enforcement module allows access to proceed. Otherwise, the lock enforcement module blocks access, sends a notification or takes another programmed action.

As will be appreciated, metadata for a document, such as the fixed location, location area or other metadata can be configured in various ways based, for example, on how a document type or document application (e.g., word processing application or other application capable of opening a document) implements metadata, plug-ins, and/or scripts.

Figure 15:
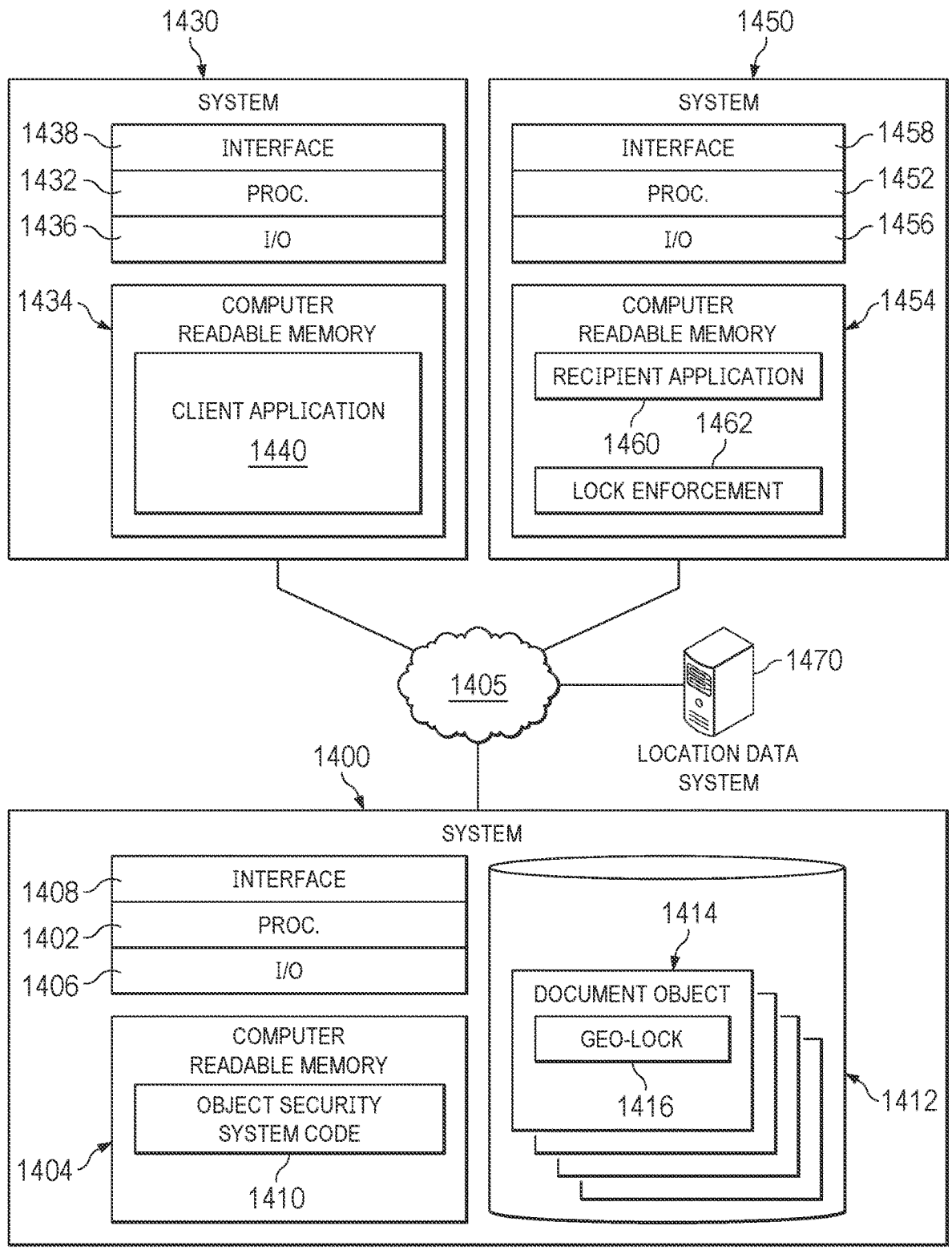
FIG. 15 is a diagrammatic representation of one embodiment of a distributed network environment.

Embodiments of the technology may be implemented on a computing system. Any combination of mobile desktop, server, embedded or other types of hardware may be used. FIG. 15 is a diagrammatic representation of one embodiment of a distributed network computing environment where embodiments disclosed herein can be implemented. The computing environment includes a first computer system 1400, a second computer system 1430, a third computer system 1450 and a location data system 1470 connected to a network 1405 (e.g., a local area network (LAN), a wide area network (WAN) such as the Internet, mobile network, or other type of network or combination thereof). Network 1405 may represent a combination of wired and wireless networks that the network computing environment may utilize for various types of network communications. Network 1405 may represent one embodiment of network 205, 305, 405, 505.

First computer system 1400 may include, for example, a computer processor 1402 and associated memory 1404. Computer processor 1402 may be an integrated circuit for processing instructions. For example, processor 1402 may comprise one or more cores or micro-cores of a processor. Memory 1404 may include volatile memory, non-volatile memory, semi-volatile memory or a combination thereof. Memory 1404, for example, may include RAM, ROM, flash memory, a hard disk drive, a solid-state drive, an optical storage medium (e.g., CD-ROM), or other computer-readable memory or combination thereof. Memory 1404 may implement a storage hierarchy that includes cache memory, primary memory or secondary memory. In some embodiments, memory 1404 may include storage space on a data storage array. First computer system 1400 may also include input/output ("I/O") devices 1406, such as a keyboard, monitor, printer, electronic pointing device (e.g., mouse, trackball, stylus, etc.), or the like. First computer system 1400 may also include a communication interface 1408, such as a network interface card, to interface with network 1405.

Memory 1404 may store instructions executable by processor 1402. For example, memory 1404 may include a set of instructions 1410 stored on a non-transitory computer-readable medium, where the instructions are executable to implement an object security system 102, or content system 210, 310, 410, 510 or other system. Computer system 1400 may comprise a data store 1412, which may be an example of a data store 104, 228, 328, 428, 528. Data store 1412, which may include one or more file systems, databases or other data stores to store managed items, provide provides an object-based data store in which documents (whole documents, document fragments) or other data resources are managed as a set of objects. Each document in data store 1412 may thus be managed as a document object 1414 that includes the document and associated metadata. In some embodiments, the document may be stored as a file. The document metadata may include, for example, an object identifier associated with a document. Documents may have geo-locks 1416 asserted thereon as discussed above. In some embodiments, data store 1412 may be a portion of memory 1404.

Second computer system 1430 may include, for example, a computer processor 1432 and associated memory 1434. Computer processor 1432 may be an integrated circuit for processing instructions. For example, processor 1432 may comprise one or more cores or micro-cores of a processor. Memory 1434 may include volatile memory, non-volatile memory, semi-volatile memory or a combination thereof. Memory 1434, for example, may include RAM, ROM, flash memory, a hard disk drive, a solid-state drive, an optical storage medium (e.g., CD-ROM), or other computer-readable memory or combination thereof. Memory 1434 may implement a storage hierarchy that includes cache memory, primary memory or secondary memory. In some embodiments, memory 1434 may include storage space on a data storage array. Second computer system 1430 may also include I/O devices 1436. Second computer system 1430 may also include a communication interface 1438, such as a network interface card, to interface with network 1405.

Memory 1434 may store instructions executable by processor 1432. For example, memory 1434 may include client application code 1440 executable to provide a client application configured or configurable to allow a user to interact with computer system 1400. Second computer system 1430 may be an example of a client system 240, 250, 340, 440, 540.

Third computer system 1450 may include, for example, a computer processor 1452 and associated memory 1454. Computer processor 1452 may be an integrated circuit for processing instructions. For example, processor 1452 may comprise one or more cores or micro-cores of a processor.

Memory 1454 may include volatile memory, non-volatile memory, semi-volatile memory or a combination thereof. Memory 1454, for example, may include RAM, ROM, flash memory, a hard disk drive, a solid-state drive, an optical storage medium (e.g., CD-ROM), or other computer-readable memory or combination thereof. Memory 1454 may implement a storage hierarchy that includes cache memory, primary memory or secondary memory. In some embodiments, memory 1454 may include storage space on a data storage array. Third computer system 1450 may also include I/O devices 1456. Third computer system 1450 may also include a communication interface 1458, such as a network interface card, to interface with network 1405.

Memory 1454 may store instructions executable by processor 1452. For example, memory 1454 may include code executable to provide a recipient application 1460 capable of opening documents and code executable to provide a lock enforcement module 1462. Computer system 1450 may be one example of a recipient system 350.

Location data system 1470 may be an example of a location data system 150, 260, 360, 460, 560.

For the purpose of illustration, a single computer system is shown for each of computer system 1400, 1430, 1450. However, each computer system 1400, 1430, 1450 may include a plurality of interconnected computers. For example, a plurality of computer systems 1400, a plurality of computer systems 1430 and a plurality of computer systems 1450 may be coupled to network 1405. Each of the computer system 1400, 1430, 1450 in FIG. 15 may have more than one processor, memory or other hardware component, though, for the sake of brevity, each computer is illustrated as having one of each of the hardware components, even if more than one is used. Methods or portions thereof described herein may be implemented through execution of suitable software code that may reside within memories 1404, 1434, 1454.

Those skilled in the relevant art will appreciate that the embodiments can be implemented or practiced in a variety of computer system configurations including, without limitation, multi-processor systems, network devices, mini-computers, mainframe computers, data processors, and the like. Embodiments can be employed in distributed computing environments, where tasks or modules are performed by remote processing devices, which are linked through a communications network such as a LAN, WAN, and/or the Internet. In a distributed computing environment, program modules or subroutines may be located in both local and remote memory storage devices. These program modules or subroutines may, for example, be stored or distributed on computer-readable media, stored as firmware in chips, as well as distributed electronically over the Internet or over other networks (including wireless networks). Example chips may include Electrically Erasable Programmable Read-Only Memory (EEPROM) chips.

Embodiments described herein can be implemented in the form of control logic in software or hardware or a combination of both. The control logic may be stored in an information storage medium, such as a computer-readable medium, as a plurality of instructions adapted to direct an information processing device to perform a set of steps disclosed in the various embodiments. Based on the disclosure and teachings provided herein, a person of ordinary skill in the art will appreciate other ways and/or methods to implement the invention. Steps, operations, methods, routines or portions thereof described herein be implemented using a variety of hardware, such as CPUs, application specific integrated circuits, programmable logic devices, field programmable gate arrays, optical, chemical, biological, quantum or nanoengineered systems, or other mechanisms.

Software instructions in the form of computer-readable program code may be stored, in whole or in part, temporarily or permanently, on a non-transitory computer-readable medium. The computer-readable program code can be operated on by a processor to perform steps, operations, methods, routines or portions thereof described herein. A "computer-readable medium" is a medium capable of storing data in a format readable by a computer and can include any type of data storage medium that can be read by a processor. Examples of non-transitory computer-readable media can include, but are not limited to, volatile and non-volatile computer memories, such as RAM, ROM, hard drives, solid state drives, data cartridges, magnetic tapes, floppy diskettes, flash memory drives, optical data storage devices, compact-disc read-only memories. In some embodiments, computer-readable instructions or data may reside in a data array, such as a direct attach array or other array. The computer-readable instructions may be executable by a processor to implement embodiments of the technology or portions thereof.

A "processor" includes any hardware system, mechanism or component that processes data, signals or other information. A processor can include a system with a general-purpose central processing unit, multiple processing units, dedicated circuitry for achieving functionality, or other systems. Processing need not be limited to a geographic location or have temporal limitations. For example, a processor can perform its functions in "real-time," "offline," in a "batch mode," etc. Portions of processing can be performed at different times and at different locations, by different (or the same) processing systems.

Different programming techniques can be employed such as procedural or object oriented. Any suitable programming language can be used to implement the routines, methods or programs of embodiments of the invention described herein, including R, Python, C, C++, Java, JavaScript, HTML, or any other programming or scripting code, etc. Communications between computers implementing embodiments can be accomplished using any electronic, optical, radio frequency signals, or other suitable methods and tools of communication in compliance with known network protocols.

Any particular routine can execute on a single computer processing device or multiple computer processing devices, a single computer processor or multiple computer processors. Data may be stored in a single storage medium or distributed through multiple storage mediums. In some embodiments, data may be stored in multiple databases, multiple filesystems or a combination thereof.

Although the steps, operations, or computations may be presented in a specific order, this order may be changed in different embodiments. In some embodiments, some steps may be omitted. Further, in some embodiments, additional or alternative steps may be performed. In some embodiments, to the extent multiple steps are shown as sequential in this specification, some combination of such steps in alternative embodiments may be performed at the same time. The sequence of operations described herein can be interrupted, suspended, or otherwise controlled by another process, such as an operating system, kernel, etc. The routines can operate in an operating system environment or as stand-alone routines. Functions, routines, methods, steps and operations described herein can be performed in hardware, software, firmware or any combination thereof.

It will be appreciated that one or more of the elements depicted in the drawings/figures can also be implemented in a more separated or integrated manner, or even removed or rendered as inoperable in certain cases, as is useful in accordance with a particular application. Additionally, any signal arrows in the drawings/figures should be considered only as exemplary, and not limiting, unless otherwise specifically noted.

In the description herein, numerous specific details are provided, such as examples of components and/or methods, to provide a thorough understanding of embodiments of the invention. One skilled in the relevant art will recognize, however, that an embodiment may be able to be practiced without one or more of the specific details, or with other apparatus, systems, assemblies, methods, components, materials, parts, and/or the like. In other instances, well-known structures, components, systems, materials, or operations are not specifically shown or described in detail to avoid obscuring aspects of embodiments of the invention. While the invention may be illustrated by using a particular embodiment, this is not and does not limit the invention to any particular embodiment and a person of ordinary skill in the art will recognize that additional embodiments are readily understandable and are a part of this invention.

As used herein, the terms "comprises," "comprising," "includes," "including," "has," "having," or any other variation thereof, are intended to cover a non-exclusive inclusion. For example, a process, product, article, or apparatus that comprises a list of elements is not necessarily limited only to those elements but may include other elements not expressly listed or inherent to such process, product, article, or apparatus.

Furthermore, the term "or" as used herein is generally intended to mean "and/or" unless otherwise indicated. For example, a condition A or B is satisfied by any one of the following: A is true (or present) and B is false (or not present), A is false (or not present) and B is true (or present), and both A and B are true (or present). As used herein, a term preceded by "a" or "an" (and "the" when antecedent basis is "a" or "an") includes both singular and plural of such term, unless clearly indicated otherwise (i.e., that the reference "a" or "an" clearly indicates only the singular or only the plural). Also, as used in the description herein and throughout the meaning of "in" includes "in" and "on" unless the context clearly dictates otherwise.

Reference throughout this specification to "one embodiment", "an embodiment", or "a specific embodiment" or similar terminology means that a particular feature, structure, or characteristic described in connection with the embodiment is included in at least one embodiment and may not necessarily be present in all embodiments. Thus, respective appearances of the phrases "in one embodiment", "in an embodiment", or "in a specific embodiment" or similar terminology in various places throughout this specification are not necessarily referring to the same embodiment. Furthermore, the particular features, structures, or characteristics of any particular embodiment may be combined in any suitable manner with one or more other embodiments. It is to be understood that other variations and modifications of the embodiments described and illustrated herein are possible in light of the teachings herein and are to be considered as part of the spirit and scope of the invention.

Additionally, any examples or illustrations given herein are not to be regarded in any way as restrictions on, limits to, or express definitions of, any term or terms with which they are utilized. Instead, these examples or illustrations are to be regarded as being described with respect to one particular embodiment and as illustrative only. Those of ordinary skill in the art will appreciate that any term or terms with which these examples or illustrations are utilized will encompass other embodiments which may or may not be given therewith or elsewhere in the specification and all such embodiments are intended to be included within the scope of that term or terms. Language designating such nonlimiting examples and illustrations includes, but is not limited to: "for example," "for instance," "e.g.," "in one embodiment."

Thus, while the invention has been described with respect to specific embodiments thereof, these embodiments are merely illustrative, and not restrictive of the invention. Rather, the description (including the Summary and Abstract) is intended to describe illustrative embodiments, features and functions in order to provide a person of ordinary skill in the art context to understand the invention without limiting the invention to any particularly described embodiment, feature or function, including any such embodiment feature or function described. While specific embodiments of, and examples for, the invention are described herein for illustrative purposes only, various equivalent modifications are possible within the spirit and scope of the invention, as those skilled in the relevant art will recognize and appreciate.

As indicated, these modifications may be made to the invention in light of the foregoing description of illustrated embodiments of the invention and are to be included within the spirit and scope of the invention. Thus, while the invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the invention.

Benefits, other advantages, and solutions to problems have been described above with regard to specific embodiments. However, the benefits, advantages, solutions to problems, and any component(s) that may cause any benefit, advantage, or solution to occur or become more pronounced are not to be construed as a critical, required, or essential feature or component.

What is claimed is:

1. An object security system comprising:
   a data store storing a document object comprising a document and associated metadata;
   a processor;
   a memory coupled to the processor, the memory configured with a set of computer instructions, the set of computer instructions comprising instructions executable by the processor to:
      provide a user interface to a user, the user interface having controls to allow the user to provide a geo-lock definition for the document, the controls including user selection controls;
      receive the geo-lock definition, the geo-lock definition comprising an allowed location; and
      assert a geo-lock on the document, asserting the geo-lock on the document comprising:
         generating a script that is executable to enforce the geo-lock based on the geo-lock definition; and
         embedding the generated script in the document object in the data store;

receive a request, over a network, to access the document;

send a response to the request to a recipient computer, the response comprising:
  the document; and
  the script,
  wherein the script is executable at the recipient computer to allow access to the document based on a determination that a target geographic location associated with the document is the allowed location and executable to take an action based on a determination that the target geographic location associated with the document is not the allowed location.

2. The object security system of claim 1, wherein the action comprises blocking access to the document.

3. The object security system of claim 1, wherein the action comprises sending a notification to the user that the access to the document is being requested from other than the allowed location.

4. The object security system of claim 1, wherein the allowed location is a fixed location.

5. The object security system of claim 1, wherein the allowed location is a user-defined area.

6. The object security system of claim 1, wherein the set of computer instructions further comprises instructions executable to enforce the geo-lock.

7. The object securing system of claim 1, wherein embedding the generated script in the document object in the data store comprises embedding the script in the document, wherein the script is embedded in the document in the response, and wherein the script comprises instructions to:
  obtain a current location of the document;
  compare the current location of the document to the allowed location;
  based on a determination that the current location of the document is the allowed location, allow access to the document; and
  based on a determination that the current location of the document is not the allowed location, perform the action.

8. A computer program product comprising a non-transitory computer-readable medium having computer-readable program code stored thereon, the computer-readable program code comprising instructions for:
  storing a document object in a data store the document object comprising a document and associated metadata;
  providing a user interface to a user, the user interface having controls to allow the user to provide a geo-lock definition for the document, the controls including user selection controls;
  receiving the geo-lock definition, the geo-lock definition comprising an allowed location; and
  asserting a geo-lock on the document, asserting the geo-lock on the document comprising:
    generating a script that is executable to enforce the geo-lock based on the geo-lock definition; and
    embedding the generated script in the document object in the data store;
  receiving a request, over a network, to access the document;
  sending a response to the request to a recipient computer, the response comprising:
    the document; and
    the script;
  wherein the script is executable at the recipient computer to allow access to the document based on a determination that a target geographic location associated with the document is the allowed location to take an action based on a determination that the target geographic location associated with the document is not the allowed location.

9. The computer program product of claim 8, wherein the action comprises blocking access to the document.

10. The computer program product of claim 8, wherein the action comprises sending a notification to the user that the access to the document is being requested from other than the allowed location.

11. The computer program product of claim 8, wherein the allowed location is a fixed location.

12. The computer program product of claim 8, wherein the allowed location is a user-defined area.

13. The computer program product of claim 8, wherein the computer-readable program code comprises instructions executable to enforce the geo-lock.

14. The computer program product of claim 8, wherein embedding the generated script in the document object comprises embedding the script in the document, wherein the script is embedded in the document in the response, and wherein the script comprises instructions for:
  obtaining a current location of the document;
  comparing the current location of the document to the allowed location;
  allowing access to the document based on a determination that the current location of the document is the allowed location; and
  performing the action based on a determination that the current location of the document is not the allowed location.

15. A method of geographic location-based control of access to objects:
  storing a document object in a data store, the document object comprising a document and associated metadata;
  providing a user interface to a user, the user interface having controls to allow the user to provide a geo-lock definition for the document, the controls including user selection controls;
  receiving the geo-lock definition, the geo-lock definition comprising geographic coordinates for an allowed location;
  asserting a geo-lock on the document asserting the geo-lock on the document comprising:
    generating a script that is executable to enforce the geo-lock based on the geo-lock definition; and
    embedding the generated script in the document object in the data store;
  receiving a request, over a network, to access the document;
  sending a response to the request to a recipient computer, the response comprising:
    the document; and
    the script,
    wherein the script is executable to allow access to the document based on a determination that a target geographic location associated with the document is the allowed location and to take an action based on a determination that the target geographic location associated with the document is not the allowed location; and
  executing the script at the recipient computer to enforce the geo-lock based on the target geographic location associated with the document.

16. The method of claim 15, wherein the action comprises blocking access to the document.

17. The method of claim 15, wherein the action comprises sending a notification to the user that the access to the document is being requested from other than the allowed location.

18. The method of claim 15, wherein the allowed location is a fixed location.

19. The method of claim 15, wherein the allowed location is a user-defined area.

20. The method of claim 15, wherein embedding the generated script in the document object comprises embedding the script in the document, wherein the script is embedded in the document in the response, and wherein the script comprises instructions for:
- obtaining a current location of the document;
- comparing the current location of the document to the allowed location;
- allowing access to the document based on a determination that the current location of the document is the allowed location; and
- performing the action based on a determination that the current location of the document is not the allowed location.

* * * * *